(12) United States Patent
Abramenko et al.

(10) Patent No.: US 11,862,147 B2
(45) Date of Patent: Jan. 2, 2024

(54) METHOD AND SYSTEM FOR ENHANCING THE INTELLIGIBILITY OF INFORMATION FOR A USER

(71) Applicant: NeoSensory, Inc., Palo Alto, CA (US)

(72) Inventors: Oleksii Abramenko, Palo Alto, CA (US); Kaan Donbekci, Palo Alto, CA (US); Michael V. Perrotta, Palo Alto, CA (US); Scott Novich, Palo Alto, CA (US); Kathleen W. McMahon, Palo Alto, CA (US); David M. Eagleman, Palo Alto, CA (US)

(73) Assignee: NeoSensory, Inc., Palo Alto, CA (US)

( * ) Notice: Subject to any disclaimer, the term of this patent is extended or adjusted under 35 U.S.C. 154(b) by 0 days.

(21) Appl. No.: 17/886,785

(22) Filed: Aug. 12, 2022

(65) Prior Publication Data

US 2023/0068099 A1    Mar. 2, 2023

Related U.S. Application Data

(60) Provisional application No. 63/276,482, filed on Nov. 5, 2021, provisional application No. 63/239,380, filed (Continued)

(51) Int. Cl.
*G10L 15/16* (2006.01)
*G10L 15/187* (2013.01)
*G10L 15/06* (2013.01)

(52) U.S. Cl.
CPC ............ *G10L 15/16* (2013.01); *G10L 15/063* (2013.01); *G10L 15/187* (2013.01)

(58) Field of Classification Search
CPC ..... G10L 15/16; G10L 15/063; G10L 15/187; G10L 21/0364; G10L 15/04; G10L 21/16;
(Continued)

(56) References Cited

U.S. PATENT DOCUMENTS 3,342,923 A   9/1967 Henley
4,255,801 A   3/1981 Ode et al.
(Continued)

FOREIGN PATENT DOCUMENTS

CN   104011794 A   8/2014
CN   105739674 A   7/2016
(Continued)

OTHER PUBLICATIONS

"Neosensory Buzz", Neosensory Aug. 17, 2020 (Aug. 17, 2020).
(Continued)

*Primary Examiner* — Abdelali Serrou
(74) *Attorney, Agent, or Firm* — Jeffrey Schox; Caitlin Ploch

(57) ABSTRACT

A system for providing information to a user includes and/or interfaces with a set of models and/or algorithms. Additionally or alternatively, the system can include and/or interface with any or all of: a processing subsystem; a sensory output device; a user device; an audio input device; and/or any other components. A method for providing information to a user includes and/or interfaces with: receiving a set of inputs; processing the set of inputs to determine a set of sensory outputs; and providing the set of sensory outputs.

13 Claims, 14 Drawing Sheets

Related U.S. Application Data on Aug. 31, 2021, provisional application No. 63/232,855, filed on Aug. 13, 2021.

(58) Field of Classification Search
CPC ... G10L 2015/025; G10L 15/22; G10L 15/26; G10L 25/30; G10L 21/0208; G10L 13/08; G10L 25/51; G10L 13/02; G10L 15/30; G10L 2015/088; G10L 25/24; G10L 25/84; G10L 13/047; G10L 15/02; G10L 15/08; G10L 15/20; G10L 2015/223; G10L 2021/02082; G10L 21/02; G10L 25/21; G10L 15/01; G10L 15/142; G10L 19/00; G10L 2021/02163; G10L 2021/02165; G10L 2021/02166; G10L 21/0272; G10L 21/043; G10L 25/90; G10L 13/00; G10L 13/027; G10L 13/04; G10L 15/28; G10L 17/26; G10L 19/005; G10L 19/04; G10L 19/08; G10L 19/26; G10L 2015/0631; G10L 2015/0638; G10L 2015/227; G10L 2021/02161; G10L 21/013; G10L 21/0216; G10L 21/0232; G10L 25/12; G10L 25/27; G10L 25/78; G10L 13/10; G10L 15/00; G10L 15/07; G10L 15/32; G10L 17/04; G10L 19/018; G10L 2015/226; G10L 25/00; G10L 25/03; G10L 25/18; G10L 25/60; G10L 25/93; G06F 3/165; G06F 3/012; G06F 18/2135; G06F 3/167; G06F 18/22; G06F 3/011; G06F 3/013; G06F 3/015; G06F 3/017; G06F 3/0482; G06F 3/04883; G06F 3/162; G06F 16/40; G06F 16/447; G06F 2218/10; G06F 3/04886; G06F 3/0489; G06F 9/50

See application file for complete search history.

(56) References Cited

U.S. PATENT DOCUMENTS

| | | | |
|---|---|---|---|
| 4,354,064 | A | 10/1982 | Scott |
| 4,581,491 | A | 4/1986 | Boothroyd |
| 4,665,494 | A | 5/1987 | Tanaka et al. |
| 4,926,879 | A | 5/1990 | Sevrain et al. |
| 5,553,148 | A | 9/1996 | Werle |
| 5,655,271 | A | 8/1997 | Maxwell-Trumble et al. |
| 6,027,463 | A | 2/2000 | Moriyasu |
| 6,155,971 | A | 12/2000 | Calhoun et al. |
| 6,155,995 | A | 12/2000 | Lin |
| 6,272,466 | B1 | 8/2001 | Harada et al. |
| 6,295,703 | B1 | 10/2001 | Adams et al. |
| 6,671,618 | B2 | 12/2003 | Hoisko |
| 7,146,218 | B2 | 12/2006 | Esteller et al. |
| 7,222,075 | B2 | 5/2007 | Petrushin |
| 7,232,948 | B2 | 6/2007 | Zhang |
| 7,921,069 | B2 | 4/2011 | Canny et al. |
| 7,979,146 | B2 | 7/2011 | Ullrich et al. |
| 8,005,681 | B2 | 8/2011 | Hovestadt et al. |
| 8,068,025 | B2 | 11/2011 | Devenyi et al. |
| 8,588,464 | B2 | 11/2013 | Albertson et al. |
| 8,724,841 | B2 | 5/2014 | Bright et al. |
| 8,754,757 | B1 | 6/2014 | Ullrich et al. |
| 8,787,606 | B2 * | 7/2014 | Gobeli .................. G10L 15/16 381/312 |
| 8,952,888 | B2 | 2/2015 | Van Den Eerenbeemd et al. |
| 9,019,087 | B2 | 4/2015 | Bakircioglu et al. |
| 9,064,387 | B2 | 6/2015 | Bhatia et al. |
| 9,104,271 | B1 | 8/2015 | Adams et al. |
| 9,124,979 | B2 | 9/2015 | Ogrady et al. |
| 9,147,328 | B2 | 9/2015 | Offreda et al. |
| 9,298,260 | B2 | 3/2016 | Karaoguz et al. |
| 9,317,116 | B2 | 4/2016 | Ullrich et al. |
| 9,324,320 | B1 | 4/2016 | Stolcke et al. |
| 9,345,433 | B1 | 5/2016 | Shinozuka et al. |
| 9,368,005 | B2 | 6/2016 | Cruz-Hernandez et al. |
| 9,386,386 | B2 * | 7/2016 | Risberg .................. G06F 3/165 |
| 9,443,410 | B1 | 9/2016 | Constien |
| 9,474,683 | B1 | 10/2016 | Mortimer et al. |
| 9,613,619 | B2 | 4/2017 | Lev-Tov et al. |
| 9,626,845 | B2 | 4/2017 | Eagleman et al. |
| 9,659,384 | B2 | 5/2017 | Shaji et al. |
| 9,682,232 | B2 | 6/2017 | Shore et al. |
| 9,714,075 | B2 | 7/2017 | Watkins et al. |
| 9,735,364 | B2 | 8/2017 | Cheng et al. |
| 9,760,171 | B2 | 9/2017 | Cruz-Hernandez et al. |
| 9,781,392 | B2 | 10/2017 | Sahay et al. |
| 9,905,090 | B2 | 2/2018 | Ullrich et al. |
| 9,987,962 | B1 | 6/2018 | Salter et al. |
| 10,258,790 | B2 | 4/2019 | Guarraia et al. |
| 10,381,016 | B2 * | 8/2019 | Lee .................. G10L 21/013 |
| 10,455,320 | B2 | 10/2019 | Ralph |
| 10,497,246 | B2 | 12/2019 | Arnold et al. |
| 10,575,777 | B2 * | 3/2020 | Ayers .................. G06F 3/013 |
| 10,642,362 | B2 | 5/2020 | Eagleman et al. |
| 10,685,666 | B2 | 6/2020 | Maziewski et al. |
| 10,739,852 | B2 | 8/2020 | Amstutz |
| 2002/0090100 | A1 | 7/2002 | Thiede et al. |
| 2002/0111737 | A1 | 8/2002 | Hoisko |
| 2002/0194002 | A1 | 12/2002 | Petrushin |
| 2003/0025595 | A1 | 2/2003 | Langberg |
| 2003/0067440 | A1 | 4/2003 | Rank |
| 2003/0117371 | A1 | 6/2003 | Roberts et al. |
| 2003/0151597 | A1 | 8/2003 | Roberts et al. |
| 2003/0158587 | A1 | 8/2003 | Esteller et al. |
| 2003/0179190 | A1 | 9/2003 | Franzen |
| 2005/0113167 | A1 | 5/2005 | Buchner et al. |
| 2005/0192514 | A1 | 9/2005 | Kearby et al. |
| 2007/0041600 | A1 | 2/2007 | Zachman |
| 2007/0242040 | A1 | 10/2007 | Ullrich et al. |
| 2007/0255556 | A1 * | 11/2007 | Michener .............. G10L 21/0364 704/E21.009 |
| 2008/0120029 | A1 | 5/2008 | Zelek et al. |
| 2008/0140422 | A1 | 6/2008 | Hovestadt et al. |
| 2008/0170118 | A1 | 7/2008 | Albertson et al. |
| 2009/0006363 | A1 | 1/2009 | Canny et al. |
| 2009/0012638 | A1 | 1/2009 | Lou |
| 2009/0096632 | A1 | 4/2009 | Ullrich et al. |
| 2010/0249637 | A1 | 9/2010 | Walter et al. |
| 2010/0302033 | A1 | 12/2010 | Devenyi et al. |
| 2010/0318007 | A1 | 12/2010 | Obrien |
| 2011/0009921 | A1 | 1/2011 | Tass et al. |
| 2011/0061017 | A1 | 3/2011 | Ullrich et al. |
| 2011/0063208 | A1 | 3/2011 | Van et al. |
| 2011/0105967 | A1 | 5/2011 | Zeng et al. |
| 2011/0202155 | A1 | 8/2011 | Ullrich et al. |
| 2011/0202337 | A1 | 8/2011 | Fuchs et al. |
| 2011/0221694 | A1 | 9/2011 | Karaoguz et al. |
| 2011/0319796 | A1 | 12/2011 | Campdera |
| 2012/0023785 | A1 | 2/2012 | Barnes et al. |
| 2012/0046579 | A1 | 2/2012 | Radl et al. |
| 2012/0283593 | A1 | 11/2012 | Searchfield et al. |
| 2013/0102937 | A1 | 4/2013 | Ehrenreich et al. |
| 2013/0163797 | A1 | 6/2013 | Suzman et al. |
| 2013/0218456 | A1 | 8/2013 | Zelek et al. |
| 2013/0265286 | A1 | 10/2013 | Da Costa et al. |
| 2013/0275126 | A1 * | 10/2013 | Lee .................. G10L 21/003 704/205 |
| 2014/0064516 | A1 | 3/2014 | Cruz-Hernandez et al. |
| 2014/0176415 | A1 | 6/2014 | Buuck et al. |
| 2014/0270190 | A1 | 9/2014 | Flynn et al. |
| 2014/0350441 | A1 | 11/2014 | Shafieloo |
| 2014/0363138 | A1 | 12/2014 | Coviello et al. |
| 2015/0003635 | A1 | 1/2015 | Baker et al. |
| 2015/0025895 | A1 | 1/2015 | Schildbach |
| 2015/0038887 | A1 | 2/2015 | Piccirillo |
| 2015/0070150 | A1 | 3/2015 | Evesque et al. |
| 2015/0120289 | A1 | 4/2015 | Lev-Tov et al. |
| 2015/0126802 | A1 | 5/2015 | Lim et al. |
| 2015/0161994 | A1 | 6/2015 | Tang et al. |
| 2015/0161995 | A1 | 6/2015 | Sainath et al. |
| 2015/0227204 | A1 | 8/2015 | Gipson et al. |

(56) References Cited

U.S. PATENT DOCUMENTS

| | | | |
|---|---|---|---|
| 2015/0230524 A1 | 8/2015 | Stevens et al. | |
| 2015/0241975 A1 | 8/2015 | Bhatia et al. | |
| 2015/0256942 A1* | 9/2015 | Kinsbergen | G10L 15/02 |
| | | | 381/313 |
| 2015/0272815 A1 | 10/2015 | Kitchens | |
| 2015/0294597 A1 | 10/2015 | Rizzo | |
| 2015/0305974 A1 | 10/2015 | Ehrenreich et al. | |
| 2015/0351999 A1 | 12/2015 | Brouse | |
| 2015/0356889 A1 | 12/2015 | Schwartz | |
| 2016/0012688 A1 | 1/2016 | Eagleman et al. | |
| 2016/0026253 A1 | 1/2016 | Bradski et al. | |
| 2016/0027338 A1 | 1/2016 | Ebeling et al. | |
| 2016/0049915 A1 | 2/2016 | Wang et al. | |
| 2016/0098844 A1 | 4/2016 | Shaji et al. | |
| 2016/0098987 A1 | 4/2016 | Stolcke et al. | |
| 2016/0103590 A1 | 4/2016 | Vu et al. | |
| 2016/0187987 A1 | 6/2016 | Ullrich et al. | |
| 2016/0239253 A1* | 8/2016 | Staffaroni | G10L 21/0364 |
| 2016/0254454 A1 | 9/2016 | Cheng et al. | |
| 2016/0255944 A1 | 9/2016 | Baranski et al. | |
| 2016/0284189 A1 | 9/2016 | Constien | |
| 2016/0292856 A1 | 10/2016 | Niemeijer et al. | |
| 2016/0297611 A1 | 10/2016 | Williams et al. | |
| 2016/0358429 A1 | 12/2016 | Ullrich et al. | |
| 2016/0367190 A1 | 12/2016 | Vaitaitis | |
| 2017/0154622 A1* | 6/2017 | Liu | G10L 15/02 |
| 2017/0169673 A1 | 6/2017 | Billington et al. | |
| 2017/0206889 A1 | 7/2017 | Lev-Tov et al. | |
| 2017/0213568 A1 | 7/2017 | Foshee | |
| 2017/0290736 A1 | 10/2017 | Idris | |
| 2017/0294086 A1 | 10/2017 | Kerdemelidis | |
| 2017/0348184 A1 | 12/2017 | Pisharodi et al. | |
| 2018/0033263 A1 | 2/2018 | Novich et al. | |
| 2018/0067558 A1* | 3/2018 | Eagleman | G09B 21/04 |
| 2018/0210552 A1 | 7/2018 | Saboune et al. | |
| 2018/0284894 A1 | 10/2018 | Raut et al. | |
| 2018/0303702 A1 | 10/2018 | Novich et al. | |
| 2018/0315343 A1 | 11/2018 | Shvartzberg et al. | |
| 2018/0374264 A1 | 12/2018 | Gatson et al. | |
| 2019/0045296 A1 | 2/2019 | Ralph | |
| 2019/0201657 A1 | 7/2019 | Popelka et al. | |
| 2019/0325887 A1* | 10/2019 | Karkkainen | G10L 21/0208 |
| 2019/0337451 A1 | 11/2019 | Bacchus et al. | |
| 2019/0379977 A1 | 12/2019 | Buttner et al. | |
| 2020/0121544 A1 | 4/2020 | George et al. | |
| 2020/0209975 A1 | 7/2020 | Eagleman et al. | |
| 2020/0335093 A1* | 10/2020 | Senior | G10L 15/16 |
| 2021/0089130 A1 | 3/2021 | Novich et al. | |
| 2021/0110841 A1 | 4/2021 | Weber et al. | |
| 2021/0169735 A1 | 6/2021 | Northen et al. | |
| 2021/0312294 A1* | 10/2021 | Kurata | G06F 17/18 |
| 2021/0312923 A1* | 10/2021 | Gaur | G10L 15/26 |
| 2021/0325969 A1 | 10/2021 | Eagleman et al. | |
| 2022/0023137 A1 | 1/2022 | Rha | |
| 2022/0078566 A1 | 3/2022 | Haefeli | |
| 2022/0108688 A1* | 4/2022 | Wang | G10L 15/065 |

FOREIGN PATENT DOCUMENTS

| | | |
|---|---|---|
| EP | 0911002 A2 | 4/1999 |
| WO | 2008106698 A1 | 9/2008 |
| WO | 2012069429 A1 | 5/2012 |
| WO | 2015028480 A1 | 3/2015 |

OTHER PUBLICATIONS

"The Wristband That Gives You Superpowers", NEO.LIFE, Jan. 10, 2019 (Jan. 10, 2019) 1-16.

Conlon, Brendan, et al., "Biomodal neuromodulation combining sound and tongue stimulation reduces tinnitus symptoms in a large randomized clinical study", Science Translational Medicine, Research Article, 12, eabb2830 (2020) Oct. 7, 2020.

Graves, Alex, et al., "Bidirectional LSTM Networks for Improved Phoneme Classification and Recognition", ResearchGate, Conference Paper, Jan. 2005.

Horvath, Samantha, et al., "FingerSight: Fingertip Haptic Sensing of the Visual Environment", Mar. 6, 2014, IEEE, vol. 2, 2014 (Year: 2014).

Inaguma, Hirofumi, et al., "Minimum Latency Training Strategies for Streaming Sequence-To-Sequence ASR", arXiv:2004.05009v2, May 15, 2020, Accepted at IEEE ICASSP 2020.

Jones, Lynette A., et al., "Development of a Tactile Vest", 2004, IEEE, 0-7695-2112-6/04 (Year: 2004).

Nakamura, Mealani, et al., "An Actuator for the Tactile Vest—a Torso-Based Haptic Device", 2003, IEEE, 0-7695-1890-7/03 (Year: 2003).

Paneels, Sabrina, et al., "What's Around Me? Multi-Actuator Haptic Feedback on the Wrist", Apr. 14-18, 2013, IEEE, 978-1-4799-0088-6/13, pp. 407-412 (Year: 2013).

Plant, Geoff, "Training in the use of the Tactaid VII: A case study", KTH Computer Science and Communication (STL-QPSR), 1994, vol. 35, No. 1, pp. 091-102., Jul. 24, 2017 00:00:00.0.

Tapson, Jonathan, et al., "The Feeling of Color: A Haptic Feedback Device for the Visually Disabled", 2008, IEEE, 978-1-4244-2879-3/08, pp .381-384 (Year: 2008).

Yu, Haibao, et al., "Low-bit Quantization Needs Good Distribution", Published in: 2020 IEEE/CVF Conference on Computer Vision and Pattern Recognition Workshops (CVPRW), Jun. 14-19, 2020.

* cited by examiner

METHOD AND SYSTEM FOR ENHANCING THE INTELLIGIBILITY OF INFORMATION FOR A USER

CROSS-REFERENCE TO RELATED APPLICATIONS

This application claims the benefit of U.S. Provisional Application No. 63/232,855, filed 13 Aug. 2021, U.S. Provisional Application No. 63/276,482, filed 5 Nov. 2021, and U.S. Provisional Application No. 63/239,380, filed 31 Aug. 2021, each of which is incorporated in its entirety by this reference.

TECHNICAL FIELD

This invention relates generally to the sensory output and signal processing fields, and more specifically to a new and useful system and method for enhancing the intelligibility of audio information for a user in the sensory output and signal processing fields.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
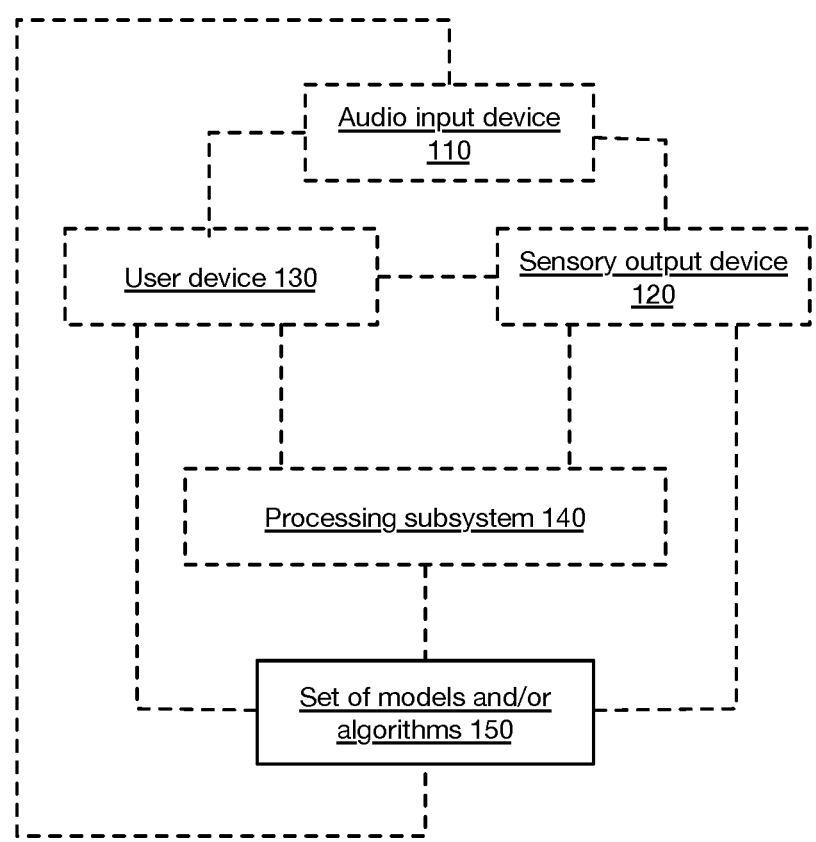
FIG. 1 is a schematic of a system for providing information to a user.

As shown in FIG. 1, a system 100 for providing information to a user includes and/or interfaces with a set of models and/or algorithms. Additionally or alternatively, the system can include and/or interface with any or all of: a processing subsystem; a sensory output device; a user device; an audio input device; and/or any other components. Further additionally or alternatively, the system can include and/or interface with any or all of the components as described in U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, U.S. application Ser. No. 15/959,042, filed 20 Apr. 2018, U.S. application Ser. No. 17/033,433, filed 25 Sep. 2020, and U.S. application Ser. No. 17/144,076, filed 7 Jan. 2021, each of which is incorporated in its entirety by this reference.

Figure 2:
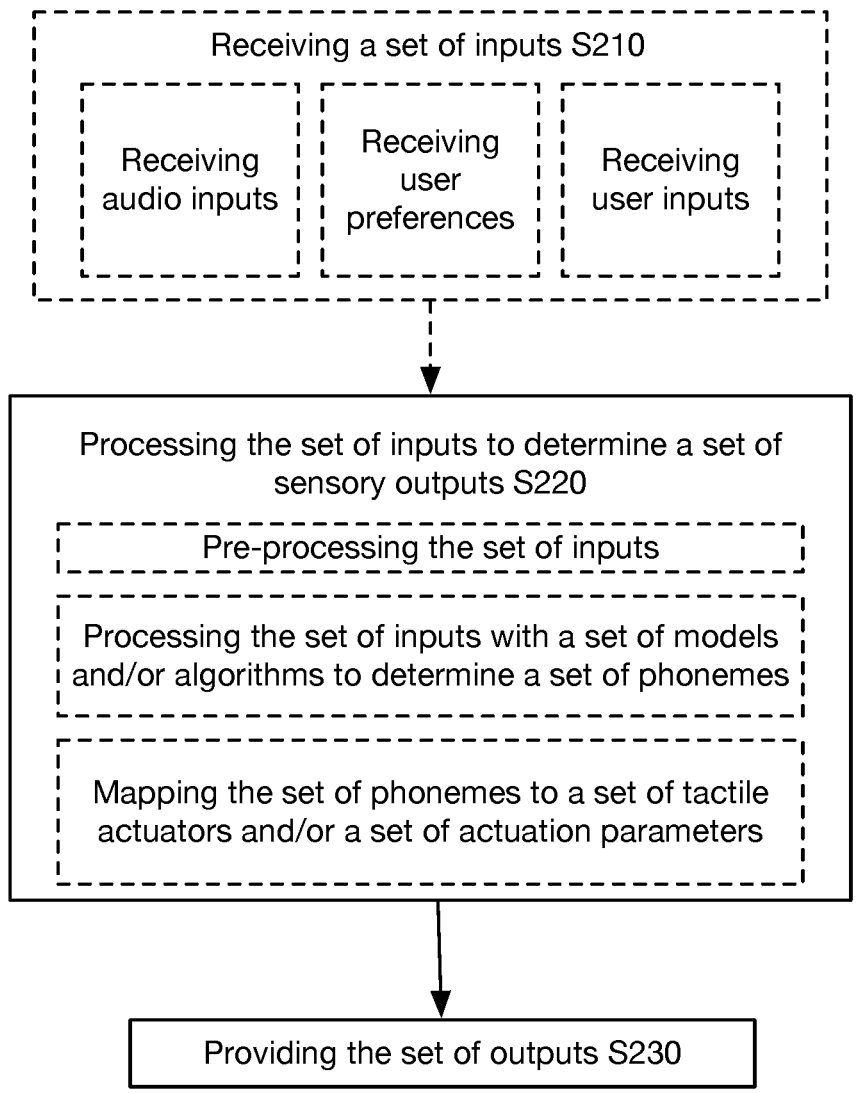
FIG. 2 is a schematic of a method for providing information to a user.

As shown in FIG. 2, a method 200 for providing information to a user includes and/or interfaces with: receiving a set of inputs S210; processing the set of inputs to determine a set of sensory outputs S220; and providing the set of sensory outputs S230. Additionally or alternatively, the method 200 can include and/or interface with any other processes. Further additionally or alternatively, the method 200 can include and/or interface with any or all of the processes described in U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, U.S. application Ser. No. 15/959,042, filed 20 Apr. 2018, U.S. application Ser. No. 17/033,433, filed 25 Sep. 2020, and U.S. application Ser. No. 17/144,076, filed 7 Jan. 2021, each of which is incorporated in its entirety by this reference, or any other suitable processes performed in any suitable order. The method 200 can be performed with a system 100 as described above and/or any other suitable system.

2. Benefits

The system and method for providing information to a user can confer several benefits over current systems and methods.

In a first variation, the technology confers the benefit of helping convey information to individuals with high frequency hearing loss, such as that which often occurs in age-related hearing loss or other hearing conditions. In specific examples, for instance, the system and/or method provide haptic stimulation (e.g., contemporaneously with the occurrence of the corresponding audio) to convey the occurrence of high frequency phonemes in an audio environment of the user. Additionally or alternatively, the haptic stimulation can convey other high frequency information (e.g., words including high frequency phonemes, non-phoneme information, etc.). In another set of specific examples, the system and/or method adjust sound parameters (e.g., frequency, pitch, volume, etc.) of high frequency phonemes in audio (e.g., recorded audio) prior to playing it to the user.

In a second variation, additional or alternative to the first, the technology confers the benefit of developing and/or utilizing signal processing techniques (e.g., algorithms, trained models, etc.) which can robustly distinguish high frequency information (e.g., high frequency phonemes) from noise. Additionally or alternatively, the signal processing techniques can be configured for any or all of: working with audio from far field conditions, working on a device with a single microphone, working on a device with limited processing and/or computing (e.g., a wearable device, a wearable wristband device, etc.), working with low latency, preventing false positives and/or false negatives, and/or otherwise enabling performance of the device.

In specific examples, for instance, the system includes a wearable tactile device with a single microphone and onboard processing system, wherein processing of audio information is performed which optimizes a tradeoff between low latency and high performance (e.g., accurate and robust identification of high frequency phonemes).

In other specific examples, for instance, the system interfaces with a processing system onboard a user device (e.g., smartphone, mobile user device, etc.), where audio received at and/or onboard the user device (e.g., from a telephone conversation, from an application such as a podcast application, etc.) is processed and altered prior to being played for the recipient user (e.g., at a set of speakers onboard the user device, at a set of speakers offboard the user device, etc.).

In a third variation, additional or alternative to those described above, the technology confers the benefit of minimizing and/or enforcing a maximum allowable latency in the processing of audio information, such that the outputs provided to the user are intelligible and comprehensible with respect to the original information from which the sensory outputs are derived. In some examples, for instance, a set of models and/or algorithms used in feature (e.g., phoneme, high frequency phoneme, etc.) detection are trained and/or otherwise configured to produce outputs within a predetermined time threshold (e.g., 50 milliseconds, between 10 and 100 milliseconds, between 40 and 60 milliseconds, etc.) such that the outputs are intelligible and do not cause confusion to the user (e.g., by being out of sync with the corresponding environmental information, by delaying one side of a two-sided conversation, etc.). In a particular example, this is accomplished through the development and use of a constrained loss function (e.g., constrained Connectionist Temporal Classification [CTC] loss function), which specifies and/or otherwise configures the models and/or algorithms to be performed within a predetermined latency.

In a fourth variation, additional or alternative to those described above, the technology confers the benefit of dynamically (e.g., with negligible delay, with minimal delay, etc.) enhancing parts of an audio signal which a user has difficulty interpreting, thereby increasing an intelligibility of the audio to the user. In a set of specific examples, for instance, audio presented to a user having high frequency hearing loss is enhanced to make high frequency phonemes (or other parts of the speech) more noticeable and/or distinguishable to the user (e.g., by increasing their energy/volume, by decreasing their pitch, etc.).

In a fifth variation, additional or alternative to those described above, the technology confers the benefit of enhancing audio and/or other sensory outputs (e.g., tactile outputs) in a way which is specifically targeted (e.g., personalized) to the hearing abilities of the user (e.g., frequencies of hearing loss). In specific examples, for instance, information associated with the user (e.g., audiogram results) and his or her hearing loss is used to determine which audio is enhanced and/or how the audio is enhanced. In a particular specific example, one or more models are trained specifically to the user, wherein the one or more models are used to process incoming audio signals.

In a sixth variation, additional or alternative to any or all of those described above, the technology confers the benefit of performing any or all of the processing locally and onboard a user device and/or sensory output device, which can function to promote privacy of the user and/or decrease latency in the audio and/or other outputs being presented to the user.

Additionally or alternatively, the system and method can confer any other benefit.

3. System 100

As shown in FIG. 1, a system 100 for providing information to a user includes and/or interfaces with a set of models and/or algorithms. Additionally or alternatively, the system can include and/or interface with any or all of: a processing subsystem; a sensory output device; a user device; an audio input device; and/or any other components. Further additionally or alternatively, the system can include and/or interface with any or all of the components as described in U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, U.S. application Ser. No. 15/959,042, filed 20 Apr. 2018, U.S. application Ser. No. 17/033,433, filed 25 Sep. 2020, and U.S. application Ser. No. 17/144,076, filed 7 Jan. 2021, each of which is incorporated in its entirety by this reference.

The system 100 functions to provide enhanced information and/or sensory outputs to a user which increases an intelligibility and/or interpretability of the user's understanding of audio information occurring in his or her environment.

In a first set of variations of the system 100, the system functions to supplement audio conveyed to a user through the provisional of tactile information at a body region (e.g., wrist, arm, leg, torso, etc.) of the user.

In a second set of variations of the system 100, the system functions to detect and enhance particular features (e.g., phonemes, words and/or sounds that a recipient user has trouble hearing and/or interpreting, etc.) in an audio stream such that the enhanced audio features are conveyed to the user as part of the naturally occurring audio.

Additionally or alternatively, the system 100 can function to process audio information and/or any other inputs, provide tactile stimulation which is optimal to a user and/or an environment of the user, provide other information (e.g., audio information, optical information, etc.) to the user, and/or otherwise provide information to the user.

3.1 System—Audio Input Device 110

The system 100 can optionally include and/or interface with an audio input device 110, which functions to receive audio information (e.g., dialogue) with which to perform the method 200. Additionally or alternatively, the audio input device no can perform any other functions. Further additionally or alternatively, audio information can be received from other sources, such as databases, libraries, and/or any other sources.

The audio input device preferably includes one or more microphones, but can additionally or alternatively include any other audio input devices. The microphones can optionally be any or all of: monodirectional, bidirectional, omnidirectional, associated with other directionalities and/or no directionality, and/or can be otherwise configured.

The audio input device(s) can be any or all of: onboard one or more devices (e.g., sensory output device, user device, headset and/or set of headphones, etc.), in an environment of one or more users, at any combination of devices and/or locations, and/or from any other sources.

Figure 3A:
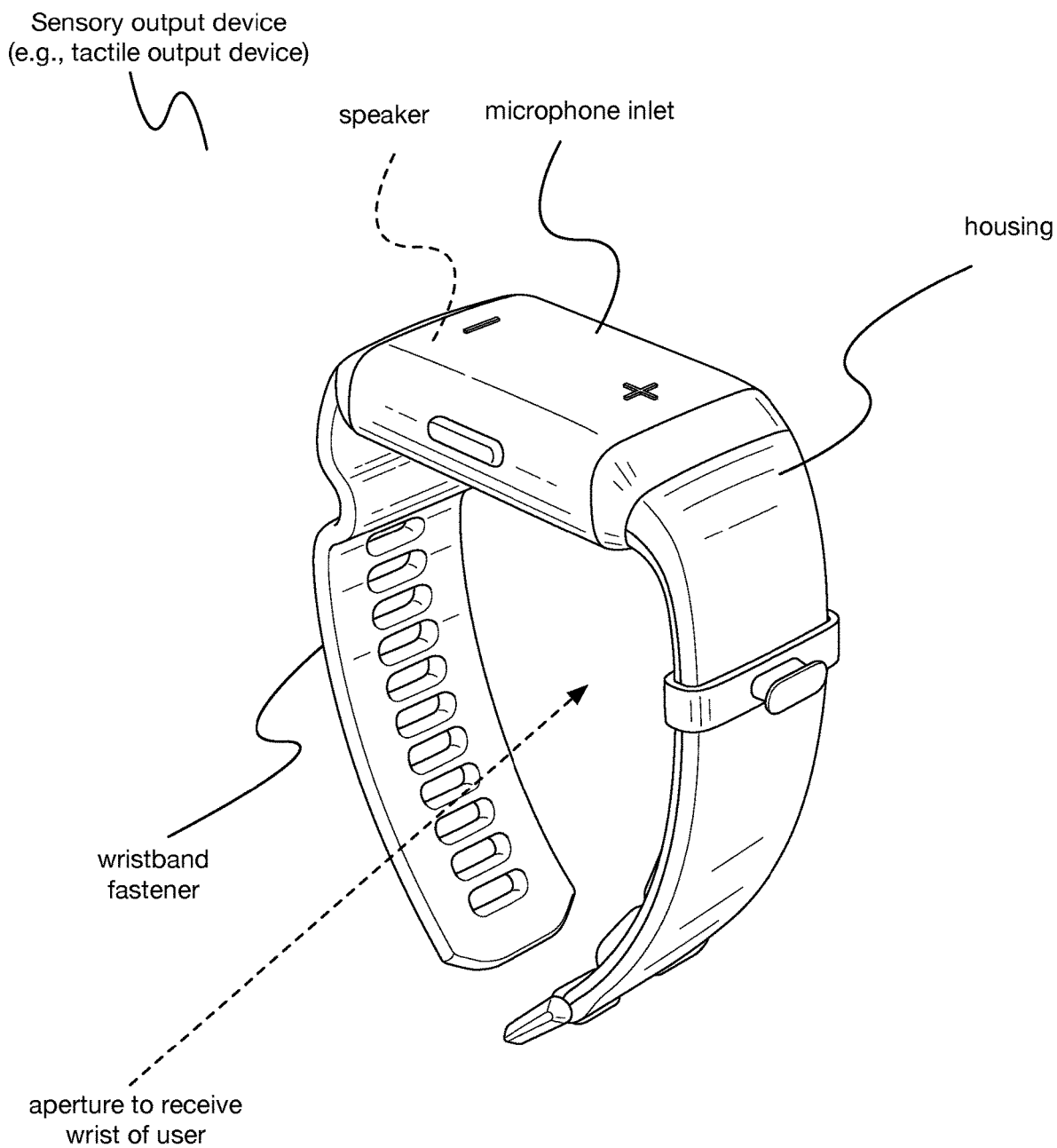
FIGS. 3A-3C depict a specific example of a wearable sensory output device.
Figure 3B:
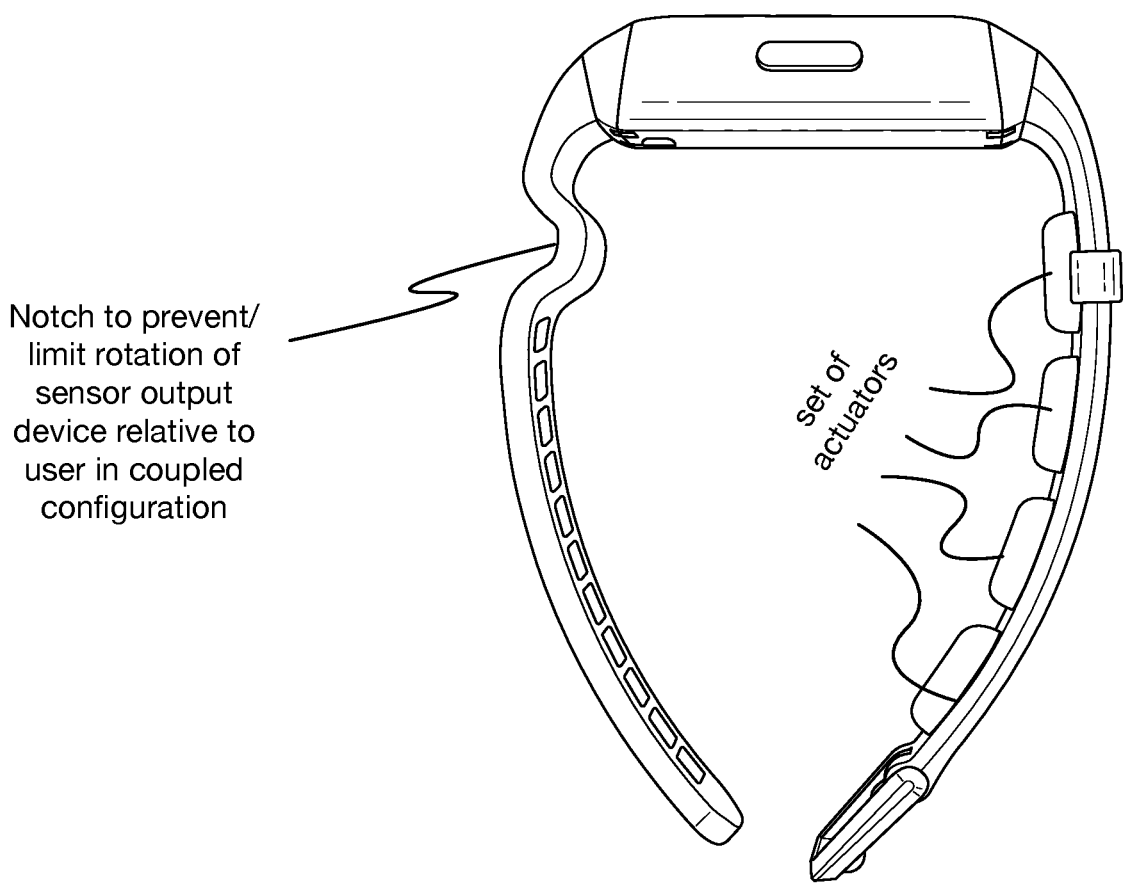
Figure 3C:
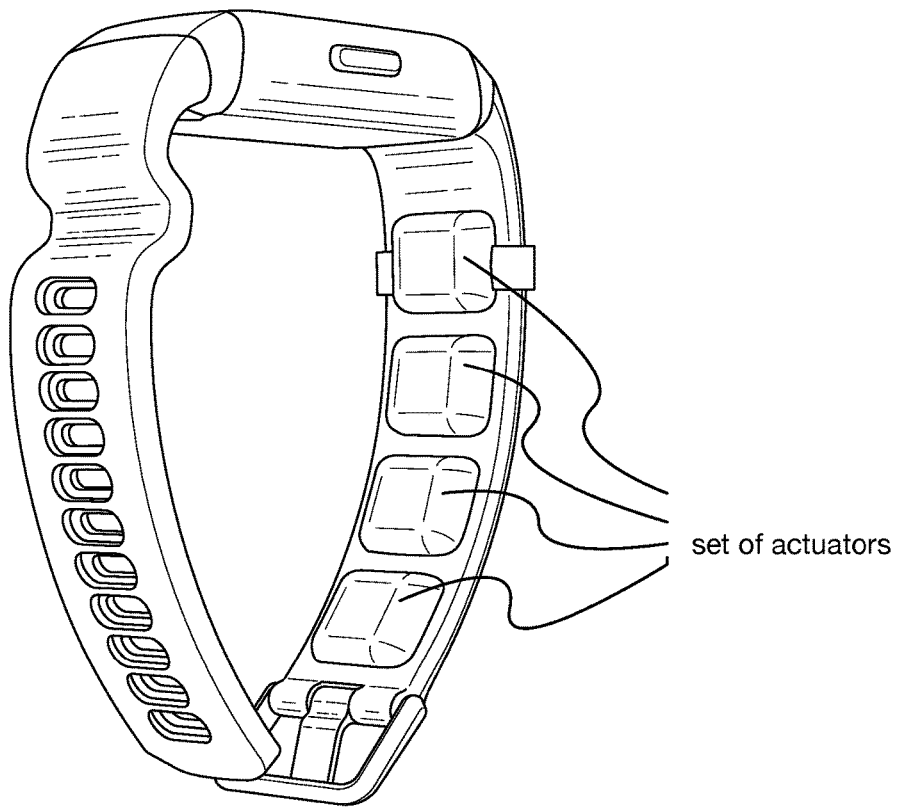
Figure 5:
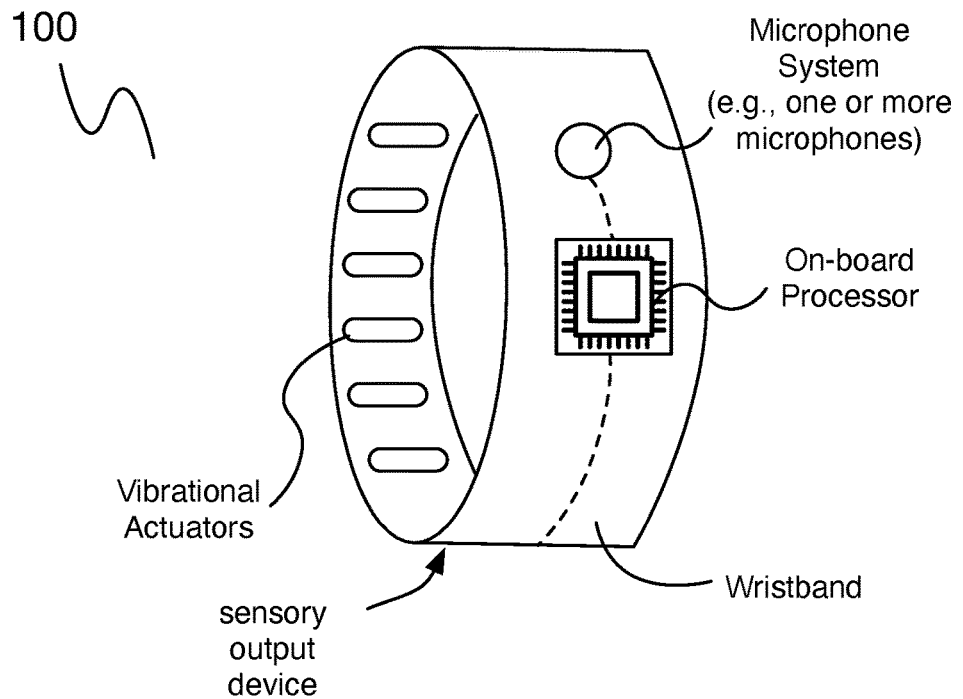
FIG. 5 depicts a variation of the system for providing information to a user.
Figure 6:
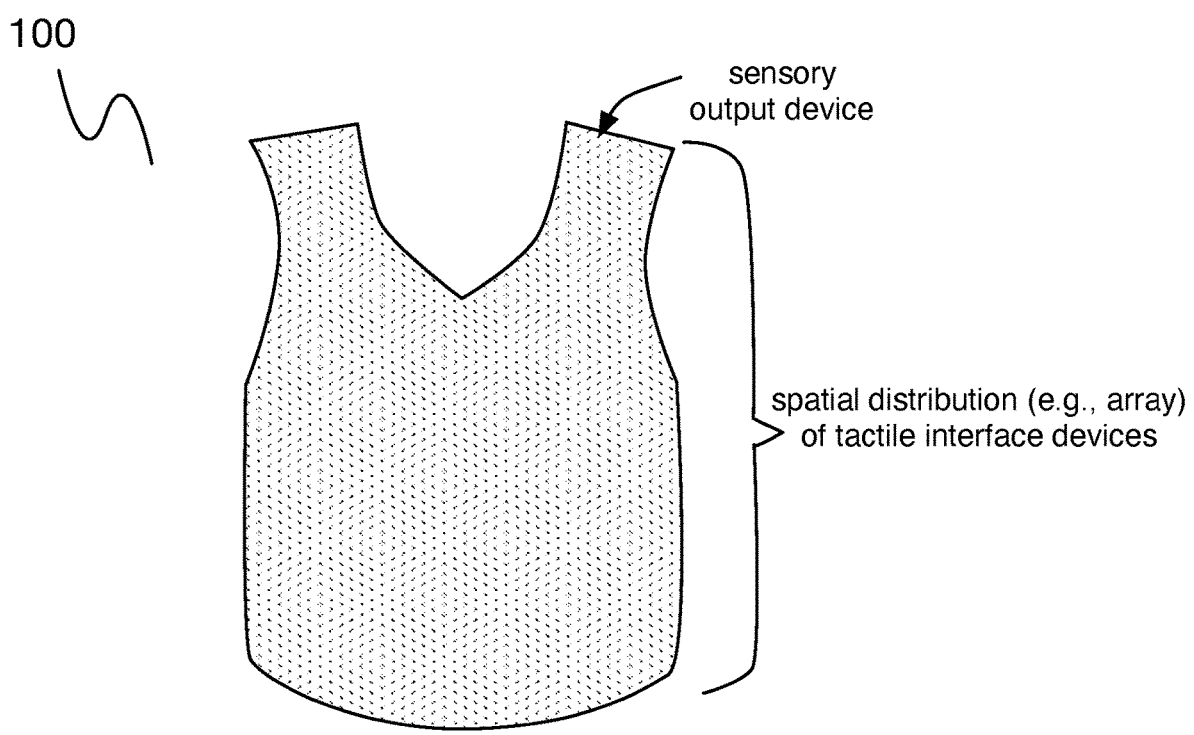
FIG. 6 depicts a variation of a sensory output device in a vest form factor.

In a first set of variations, a set of one or more audio input devices are arranged onboard a wearable device of the user, such as a device configured to provide tactile stimulation to the user. In a first set of examples, for instance, the system includes a set of one or more microphones arranged onboard a tactile stimulation wristband (e.g., as shown in FIG. 3A, as shown in FIG. 5, etc.), where the microphones record audio information from an environment of the user. In a second set of examples, the system includes a set of one or more microphones arranged onboard a tactile stimulation vest (e.g., as shown in FIG. 6) or other garment, wherein the microphones record audio information from an environment of the user.

In a second set of variations, a set of one or more audio input devices are arranged onboard a user device (e.g., mobile user device), such that audio from users can be recorded and altered prior to provision to other users (e.g., recipient users having high frequency hearing loss). Additionally or alternatively, audio information from an environment of the user can be recorded from the audio input devices onboard the user device.

In a third set of variations, a standalone microphone and/or microphone integrated within a headset and/or set of headphones is used to record audio information from a user (e.g., individual providing dialogue to a user with high frequency hearing loss) and/or an environment of the user.

In a fourth set of variations, in addition or alternative to collecting dynamic (e.g., real-time) audio information, pre-recorded audio information can be received (e.g., retrieved from a library, database, application, audio file, etc.) and processed in the method 200. In a set of specific examples, for instance, audio retrieved at a user device (e.g., via a podcast application, via an audio book application, via an audio file, etc.) and/or any other device can be processed in the method 200. Further additionally or alternatively, non-audio information (e.g., text, messages, visual information, etc.) can be received and processed in the method 200.

The system 100 can additionally or alternatively include any other input devices, such as other sensors configured to receive information with which to determine and/or provide outputs to the user. These can include, for instance, any or all of: optical sensors, location sensors, temperature sensors, motion sensors, orientation sensors, and/or any other sensors.

3.2 System—Sensory Output Device 120

The system 100 can optionally include a sensory output device 120, which functions to provide sensory outputs to the user. The sensory outputs preferably function to enhance (e.g., supplement) any or all of the audio information provided to a user, but can additionally or alternatively function to enhance particular types and/or subsets of audio (e.g., dialogue), replace certain audio of the audio information (e.g., replace audio phonemes with tactile representations), and/or can perform any other functions.

The sensor output device can optionally include a tactile stimulation device (equivalently referred to herein as a tactile device and/or haptic device) (e.g., as shown in FIGS. 3A-3C, FIG. 5, FIG. 6, FIG. 7, FIG. 10, etc.), which functions to provide tactile stimulation to a user, thereby conveying tactile information (e.g., representing audio information, representing particular features of the audio information, representing high frequency phonemes, etc.) to the user.

The tactile device is preferably a wearable device configured to be reversibly coupled to (e.g., fastened to, worn by, held by, etc.) the user, but can additionally or alternatively include a device irreversibly coupled to the user. Further additionally or alternatively, the tactile device can be a non-wearable device such as a tabletop device, handheld device, and/or any other suitable device.

The tactile device preferably includes an actuation subsystem, which functions to apply the haptic (e.g., vibratory) stimulation to the user. The actuation subsystem preferably includes a set of actuators, which individually and/or collectively function to provide the haptic stimulation to a body region of the user. Additionally or alternatively, the haptic stimulation can include electric pulses, heat, and/or any other tactilely perceivable stimulation. In a preferred set of variations, the body region includes a partial or full circumference of one or more wrists of the user, but can additionally or alternatively include any or all of: a hand, arm, finger, leg, torso, neck, head, ankle, and/or any other suitable body part or body region of the user.

The set of actuators can include one or more of: a motor (e.g., brushless motor, brushed motor, direct current (DC) motor, alternating current (AC) motor, eccentric rotating mass (ERM), etc.), an actuator (e.g., linear resonant actuator (LRA), electroactive polymer (EAP) actuator, electromechanical polymer (EMP) actuator, etc.), a piezoelectric device, and/or any other form of vibratory element. In a set of actuators including multiple actuators, the actuators can be arranged in an array (e.g., 1-dimensional array, 2-dimensional array, 3-dimensional array, etc.), arranged at least partially circumferentially around the body part (e.g., around a wrist, around half of the circumference of the wrist, etc.), arranged along the body part (e.g., up and down an arm), arranged over a body region (e.g., over the user's trunk, stomach, etc.), arranged among different body parts of a user (e.g., arranged around both wrists), and/or arranged in any other suitable way. The vibratory elements can be directly coupled to the skin of a user, separated from a user by an element of the housing (e.g., the wristband), placed over a user's clothing, and/or coupled to the user in any other way. In variations of the system configured to apply haptic stimulation to a wrist of the user, the system preferably includes 4 LRA actuators arranged around a portion of the circumference (e.g., half the circumference) of the wrist. Additionally or alternatively, the system can include actuators circumscribing the entire wrist (e.g., 8 LRA actuators), and/or any other suitable number and arrangement of actuators.

The actuation subsystem is preferably operated in accordance with a set of stimulation patterns (e.g., series of stimulation patterns), wherein the stimulation patterns prescribe any or all of the following to the set of actuators (e.g., individually, collectively, etc.): amplitude of vibration, timing of vibration (e.g., when to start, duration, when to end, duration of time between vibrations, etc.), sequence of vibration, identification of which of the set of actuators to vibrate, frequency of vibration, and/or any other parameter(s) of stimulation. In preferred variations, the stimulation pattern prescribes an amplitude of vibration and a duration of vibration to one or more actuators of the set of actuators, wherein each of the set of actuators is configured to vibrate at a fixed frequency. Additionally or alternatively, the stimulation pattern can prescribe a frequency of vibration, a dynamic pattern of vibration (e.g., alternating between actuators), and/or any other suitable characteristic or parameter(s) of vibration. The set of stimulation patterns is preferably determined, at least in part, with a processing subsystem as described below, but can additionally or alternatively be predetermined, prescribed, and/or otherwise determined and/or assigned.

Additionally or alternatively, the actuation subsystem can be operable in any number of modes, wherein the method 200, for instance, can be performed in accordance with a particular operation mode. Additionally or alternatively, the tactile device can be otherwise operated.

The actuation subsystem can include a haptic driver (e.g., LRA driver) configured to actuate the set of actuators according to the stimulation pattern. Additionally or alternatively, the actuators can be actuated in any suitable way with any other suitable component(s).

The tactile device can optionally include a housing, which functions to support the set of actuators. The housing can additionally or alternatively function to: suspend the set of actuators, maintain a separation distance between the set of actuators, maintain an offset (e.g., minimize, maintain a constant offset, etc.) of the set of actuators from a skin surface of the user, conform to a variety of users (e.g., conform to a variety of user wrist sizes, flex to wrap around a user's wrist, etc.), house other components of the system (e.g., sensor subsystem, control module, etc.), be comfortable to a user, enhance a vibration of the actuators (e.g., minimize a dampening of the haptic output), reduce direct sound transmission from the set of actuators to a microphone, maintain an orientation of the system on a user (e.g., prevent rotation of the support subsystem on the wrist of a user), assist in alignment of the support subsystem, and/or perform any other suitable function.

The tactile device preferably includes and/or interfaces with (e.g., as another component of the system 100) an audio input device (e.g., as part of a greater sensor subsystem), which functions to receive information from an environment of the user and/or any other information sources (e.g., recorded message, written message, recording, etc.). This can include, for instance, audio information from a set of microphones (e.g., unidirectional microphones, bidirectional microphones, omnidirectional microphones, etc.) or other audio sensors with which to determine and/or trigger haptic stimulation to be applied to the user (e.g., in organic exposure therapy for tinnitus). Additionally or alternatively, the sensor subsystem can include any other suitable sensors (e.g., camera or other optical sensor(s), GPS system or other location sensor(s), accelerometer and/or gyroscope and/or other motion sensor(s), etc.) configured to receiving any other information.

The sensor subsystem can be arranged onboard the tactile device, offboard the tactile device (e.g., remote from the tactile device, onboard a user device in communication with the tactile device, in an environment of the user, etc.), or any combination.

The system can optionally include any number of output devices, such as, but not limited to, any or all of: speakers (e.g., to provide audio outputs), optical components (e.g., lights, light emitting diodes [LEDs], etc.), and/or any other output devices.

Additionally or alternatively, the tactile device can include and/or interface with any other components.

Further additionally or alternatively, the sensory output device can be configured to provide sensory outputs other than and/or additional to tactile stimulation, such as, but not limited to: audio information, optical information, and/or any other information.

Additional or alternatively to a tactile device, the sensory output device can include and/or interface with a user device. Examples of the user device include a tablet, smartphone, mobile phone, laptop, watch, or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component.

In some variations, for instance, the sensory output device includes a set of one or more audio output devices (e.g., speakers), which function to provide enhanced and/or altered audio (e.g., modified version of the audio information) to the user. In some examples, for instance, the sensory output device includes and/or interfaces with a user device, which provides enhanced audio to a user through a set of speakers.

Additionally or alternatively, any or all of the sensory outputs can be provided with a wearable device (e.g., tactile device which also provides audio outputs), a combination of devices (e.g., tactile device and user device, etc.), any other devices, and/or any combination of devices.

3.3 System—Processing Subsystem 140

The system 100 preferably includes a processing subsystem 140, which functions to process information (e.g., audio information as described above) to determine a set of sensory outputs (e.g., tactile outputs, audio outputs, etc.) to provide at a body region (e.g., skin surface) of the user (e.g., at a tactile device). Additionally or alternatively, the processing subsystem can function to process any other inputs (e.g., text inputs) or information, and/or to provide any other outputs.

The processing subsystem can include and/or interface with any or all of: one or more processors (e.g., CPU or other microprocessor, control circuit, relay system, etc.), computer memory modules (e.g., RAM), computer storage modules (e.g., hard disk drive, flash memory, etc.), and/or any other suitable elements.

At least a portion of the processing subsystem is preferably arranged onboard one or more sensory output devices (e.g., tactile device, user device, etc.). Additionally or alternatively, any or all of the processing subsystem can be arranged and/or implemented remote/offboard from the sensory output device, such as at any or all of: a remote computing system (e.g., cloud computing system), another device (e.g., a mobile computing device in communication with the tactile device, another tactile device, etc.), and/or any other processing and/or computing subsystems. In a preferred set of variations, the processing subsystem is arranged fully onboard a tactile device. In an alternative set of variations, a portion of the processing subsystem is arranged onboard the tactile device and in communication with a second portion of the processing subsystem arranged remote from the tactile device. In yet another alternative variation, the entire processing subsystem is arranged offboard the tactile device (e.g., at a user device [e.g., mobile computing device]). Additionally or alternatively, the processing subsystem can be otherwise suitably arranged and/or distributed.

The processing subsystem preferably implements one or more trained models and/or algorithms 150, which function to process audio information (e.g., as described below in S210) and identify features of the audio information. The features preferably include high frequency information, further preferably high frequency phonemes (e.g., /th/, /f/, /s/, /h/, /k/, /z/, /b/, /dh/, /t/, /d/, /v/, etc.), but can additionally or alternatively include low frequency information (e.g., low frequency phonemes), multiple phonemes and/or combinations of phonemes (e.g., n-gram of phonemes, bigram of phonemes, trigram of phonemes, multiple phonemes occurring in succession such as an \s\ phoneme followed by a \t\phoneme, etc.), non-phoneme information (e.g., other acoustic features or sounds, acoustic features or sounds which sound like phonemes, etc.), and/or any other information. Additionally or alternatively, the set of trained models can be configured for any or all of: distinguishing audio features (e.g., high frequency audio features) from noise, detecting audio features in both near and far field conditions, detecting audio features with only a single microphone, detecting audio features with multiple microphones, robustly detecting audio features with limited computing (e.g., onboard a wearable device), detecting audio features with low latency, optimizing for a tradeoff between low latency and high performance, and/or any the set of trained models can be otherwise suitably configured.

In a preferred set of variations, the set of trained models and/or algorithms 150 is configured to detect high frequency phonemes from audio information collected in an environment of the user. In specific examples, the set of trained models and/or algorithms is further specifically configured to robustly (e.g., repeatedly, reliably, with an occurrence of false positives below a predetermined threshold, with an occurrence of false positives below a predetermined threshold, with an occurrence of false negatives below a predetermined threshold, etc.) detect high frequency phonemes in the presence of noise, which is conventionally difficult to distinguish from high frequency phonemes due to their similarities. Additionally or alternatively, the set of trained models and/or algorithms can be otherwise configured, such as for any or all of the outcomes as described above.

The trained models and/or algorithms preferably include one or more deep learning models and/or algorithms, further preferably one or more neural networks. Additionally or alternatively, the trained models and/or algorithms can include other machine learning models and/or machine learning algorithms. Further additionally or alternatively, the processing subsystem can implement any number of non-trained models or other tools, such as, but not limited to, any or all of: a set of algorithms, a set of equations, a set of programmed rules, and/or any other tools.

In preferred variations including one or more neural networks, the neural networks preferably include a set of recurrent neural net layers which function to detect a set of high frequency phonemes in audio in the environment of the user. The neural network further preferably includes one or more convolutional layers, which function to improve the detection of time and/or frequency features in the collected audio, thereby providing additional information with which the neural network can use to make decisions (e.g., deciding between two different phonemes). The convolutional layer preferably includes a lookahead mechanism (e.g., with future context size being at least one frame) to provide this benefit, but can additionally or alternatively be otherwise configured and/or designed.

Additionally or alternatively, the neural networks can be any or all of: absent of recurrent neural net layers, absent of convolutional layers, and/or can include any other architecture.

In a specific example, the set of trained models includes a neural network including multiple (e.g., 3, 2, 4, greater than 4, etc.) recurrent neural network (RNN) layers and one or more (e.g., 1, 2, 3, more than 3, etc.) convolutional neural network (CNN) layers. In this specific example, RNNs are chosen (e.g., over long short-term memory [LSTM] layers) specifically due to their ability to be implemented with low latency (e.g., less than 50 milliseconds [ms], less than 40 ms, less than 30 ms, less than 20 ms, less than 10 ms, less than 100 ms, etc.) for small networks, which can be deployed on embedded devices (e.g., in the case of a wearable device as described above). In this specific example, for instance, the inventors have discovered that RNNs can be used rather than LSTMs because their performance on small networks is similar to that of LSTMs given the same or similar numbers of trainable parameters, and the RNNs can be evaluated approximately and/or at least twice as fast. Additionally or alternatively, other recurrent architectures with built-in state management (e.g., LSTMs, Gated Recurrent Units [GRUs], etc.) can be used, LSTMs can be used in place of RNNs, LSTMs can be used together with RNNs, and/or any other neural network architecture can be implemented on and/or off the device.

The trained model(s) (e.g., neural network with RNN and CNN architecture) is preferably trained with one or more loss functions. Additionally, the trained model(s) can optionally be trained with a force aligned labels, which confers benefits in low latency (e.g., as compared to other loss functions and/or processes). In some variations, for instance, the trained model is trained with a cross-entropy loss function and force aligned labels which confers low latency advantages.

The trained model is further preferably trained with a constrained loss functions, which functions to ensure that the outputs of the trained model can be produced (e.g., and sensory outputs correspondingly provided to the user) within a predetermined time threshold. This can function to enable intelligibility and/or interpretability of the audio information to be maintained. For instance, in an event that enhanced audio is provided to a user with hearing loss while he or she is conversing with another person, the audio can be enhanced and played back to the user in such a way that intelligibility of the conversation is not sacrificed. In another instance, in an event that tactile stimulation is correspondingly applied to naturally occurring audio, the constrained loss function enables the tactile stimulation to be applied contemporaneously with (e.g., overlapping with, partially overlapping, in quick succession with, etc.) the corresponding audio such that the user can interpret it as being applied to the correct audio portions.

In some variations, for instance, the trained model can be trained with a sequence-based loss function (e.g., Connectionist Temporal Classification [CTC] loss function, Recurrent-Neural-Network-Transducer [RNN-T] loss function, etc.) which does not require forced alignment and typically has higher and unconstrained latency as compared with forced alignment, but can result in better performance and higher accuracy. In some variations, a reworked CTC loss function—equivalently referred to herein as a latency-constrained CTC loss function—is used which has been designed to prescribe an upper bound to the latency by enforcing certain constraints within the loss function algorithm and prohibiting even a theoretical possibility of delayed phoneme emission. Additionally or alternatively, any other CTC loss function can be used and/or the CTC loss function can be otherwise altered.

The latency is preferably less than and/or at most equal to 150 milliseconds, but can additionally or alternatively be any or all of: greater than 150 milliseconds (e.g., 200 milliseconds, between 150-200 milliseconds, between 150 and 300 milliseconds, greater than 300 milliseconds, etc.), less than 150 milliseconds (e.g., 100 milliseconds or less, 50 milliseconds or less, 25 milliseconds or less, between 0 and 100 milliseconds, etc.), and/or any other value. In some use cases and individuals, for instance, a latency greater than 150 milliseconds can result in the brain having difficulty in properly interpreting and/or correlating two incoming signals.

Additionally or alternatively, any other loss functions and/or training processes can be used.

The trained model can additionally or alternatively be trained with curriculum learning, which can function to improve the detection of audio features based on training the model and/or models with a simplest subset of data first (e.g., easiest data to learn based on, least complex audio data, least noisy audio data, most clear audio data, most intelligible audio data, etc.) and then increasing the complexity (e.g., adding noise, incorporating complex room configurations, etc.) of the training data in subsequent training processes. In a set of examples, for instance, the set of trained models is first trained with clean audio data, and then trained with audio data incorporating noise, and then trained with augmented audio data (e.g., including multiple speakers, including multiple speakers and noise, including audio artifacts, etc.).

Figure 8:
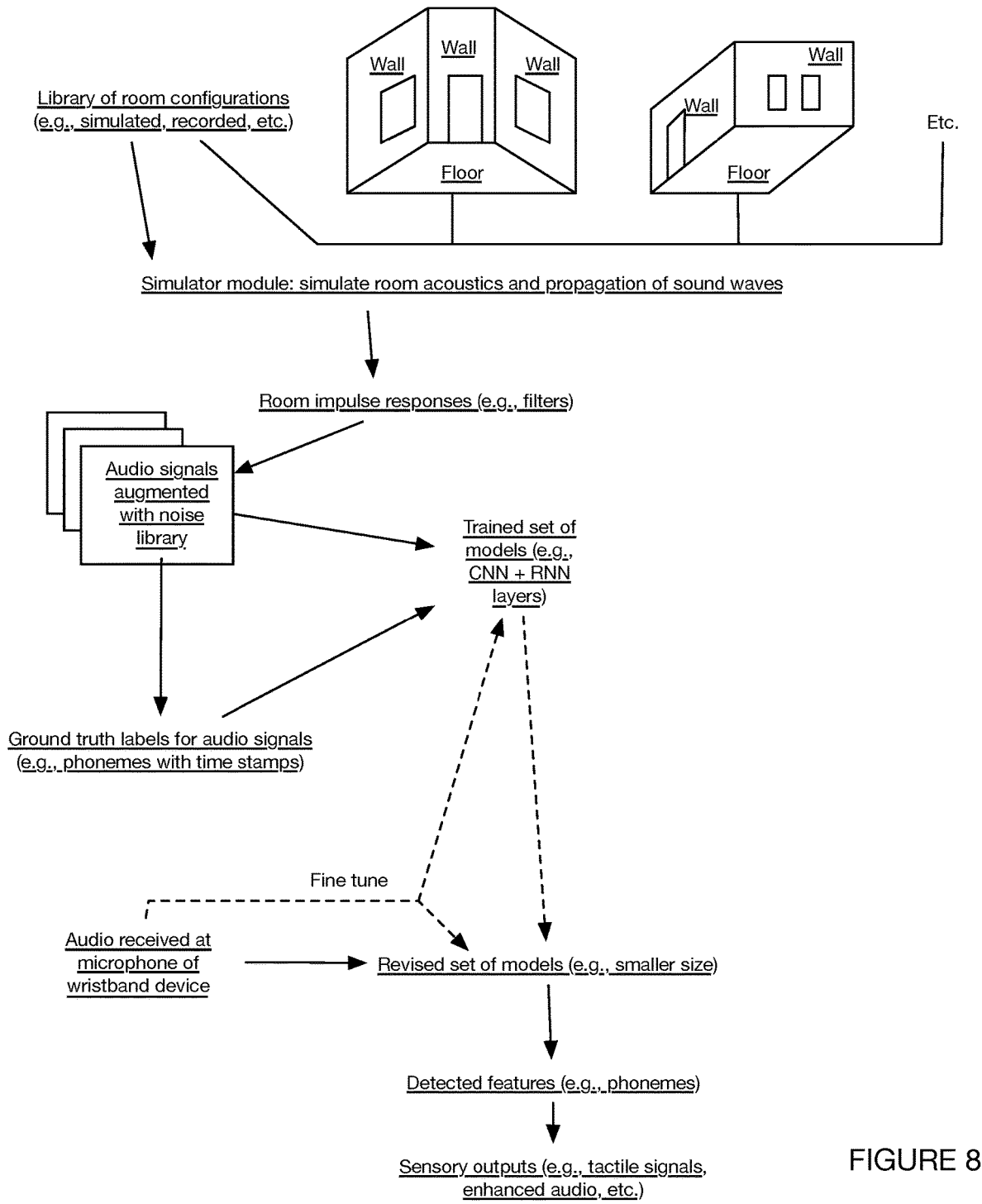
FIG. 8 depicts a variation of a set of models and/or algorithms for providing a set of sensory outputs to a user.

The training data for the trained model preferably includes phoneme time step data obtained through a ground truth identification process (e.g., forced alignment process, as shown in FIG. 8, etc.), wherein audio training data is divided into frames and labeled with any phonemes present. In specific examples, for instance, a Hidden Markov Model [HMM] based forced aligner is used to annotate speech data on a phonetic level, and as a result of the forced alignment process, timestamps indicated start and end positions of each phoneme in the audio file are produced. Additionally or alternatively, any or all of the training data can be hand labeled, any or all of the training data can be labeled (e.g., with ground truth labels) using a larger non-constrained neural network, and/or any or all data can be otherwise labeled.

In some variations, a majority of the training data used to train models for high frequency phoneme detection and/or other high frequency features is audio speech data from women and children in comparison with audio speech data from men, as the inventors have discovered that this can improve performance of one or more trained models (e.g., due to the higher occurrence of high frequency phonemes in women and children). Additionally or alternatively, any other training data and/or composition of training data can be used.

The trained model(s) is further preferably trained to be robust for high frequency audio (e.g., high frequency phoneme) detection. This preferably includes, for instance, training the model to be robust to far field high frequency audio features. In some variations, for instance, this includes performing a set of simulations as part of the training process, wherein the set of simulations is configured to simulate various room conditions and arrangements of audio sources within a room. For instance, in some variations, the simulations place a virtual sound source at a first random location within a virtual room and place a microphone at a second random location within the virtual room. As the virtual sound source is played, the audio received at the microphone can take into account reflection, reverberation, and/or any other properties arising from the room and the locations of the virtual sound source and virtual microphone. Additionally or alternatively, the room properties can be adjusted (e.g., size of room, height of room, shape of room, number of walls in room, etc.), obstacles can be arranged between the speaker and the microphone (e.g., partially shut door, curtain, furniture, etc.), and/or any other properties can be adjusted.

In a set of specific examples, room acoustics and propagation of sound waves within the room are simulated using an impulse response augmentation method. In this, a set of multiple (e.g., hundreds, thousands, etc.) of rooms with random but realistic shapes are generated and their response captured based on random placements of audio source(s) and microphone(s). In preferred specific examples, the impulse response augmentation method is preferably performed with zero-phase impulse response augmentation, which confers the benefit of not introducing a time delay to the signal, thereby making it easier to synchronize processed audio with associated forced aligned labels in the training process. Additionally or alternatively, a non-zero phase can be implemented in the room impulse response process.

Additional or alternative to room simulations, one or more simulations can include mixing in noise with randomized signal-to-noise ratio (SNR) values. The noise can include any or all of: artificially generated white noise, recorded real-word background noise, and/or any other noise. In specific examples, to reduce false positives of the method due to noise corresponding to aggressive environmental sounds (e.g., door closing, hair dryer, barking dog, etc.), a mixture of artificially synthesized impact noises can be used in simulations.

Training one or more models can additionally or alternatively include one or more transfer learning processes, wherein the transfer learning process uses the training of a larger neural network, which achieves superior results due to its larger size, to train a smaller neural network which is ultimately implemented (e.g., due to computing constraints on an embedded device). In specific examples, this is performed with a student-teacher approach, but can additionally or alternatively include any other transfer learning approaches.

Additionally or alternatively, any or all of the models can be otherwise trained, additionally trained, untrained, and/or otherwise configured.

In variations in which the trained models are processed onboard a device (e.g., embedded device, wearable, mobile device, etc.) with limited processing/computing resources, the training process can include one or more size reduction processes, which function to enable the model(s) to be performed on this device with its available (e.g., limited) compute and/or with a minimized latency.

The size reduction process(es) can optionally include a quantization process, which functions to reduce model size (e.g., of about 3× thereby enabling 4 models to fit in the same storage size as 1 before quantization) and/or memory consumption by representing model parameters and/or weights with more compact data types of lower, yet sufficient, numerical precision. Additionally or alternatively, the quantization process can function to enable the model(s) to run faster on the device and/or result in improved (e.g., smaller) inference latency. The quantization process can, however, result in a decrease in prediction accuracy of the trained model(s). To prevent and/or minimize this, the method 200 can include designing and/or applying quantization-aware techniques (e.g., during training) configured to constrain (e.g., squeeze) the dynamic range of neural network weights and activations, such as, but not limited, a distribution reshaping process. Additionally, one or more penalties (e.g., infinity norm penalty) can optionally be applied during quantization-aware training.

The size reduction process can further additionally or alternatively include a shrinking process, which functions to minimize the size (e.g., computational size, computational requirements, size of integers in model, etc.) of the trained models, and/or any other size reduction processes. The shrinking process is preferably performed such that it prevents and/or minimizes performance degradation, but can otherwise be suitably performed.

Additionally or alternatively, the processing subsystem can include and/or implement any other models, trained in any suitable way and/or untrained.

The processing subsystem can additionally or alternatively include and/or implement one or more models and/or algorithms (e.g., trained models and/or algorithms, same as any or all of those described above, separate and distinct from any or all of those described above, etc.) which function to pre-process the audio information (e.g., audio signal). Additionally or alternatively, pre-processing the audio information can be performed with one or more rule-based tools (e.g., algorithm, natural language processing tool, decision tree, lookup table, etc.) and/or any combination of tools.

Figure 13:
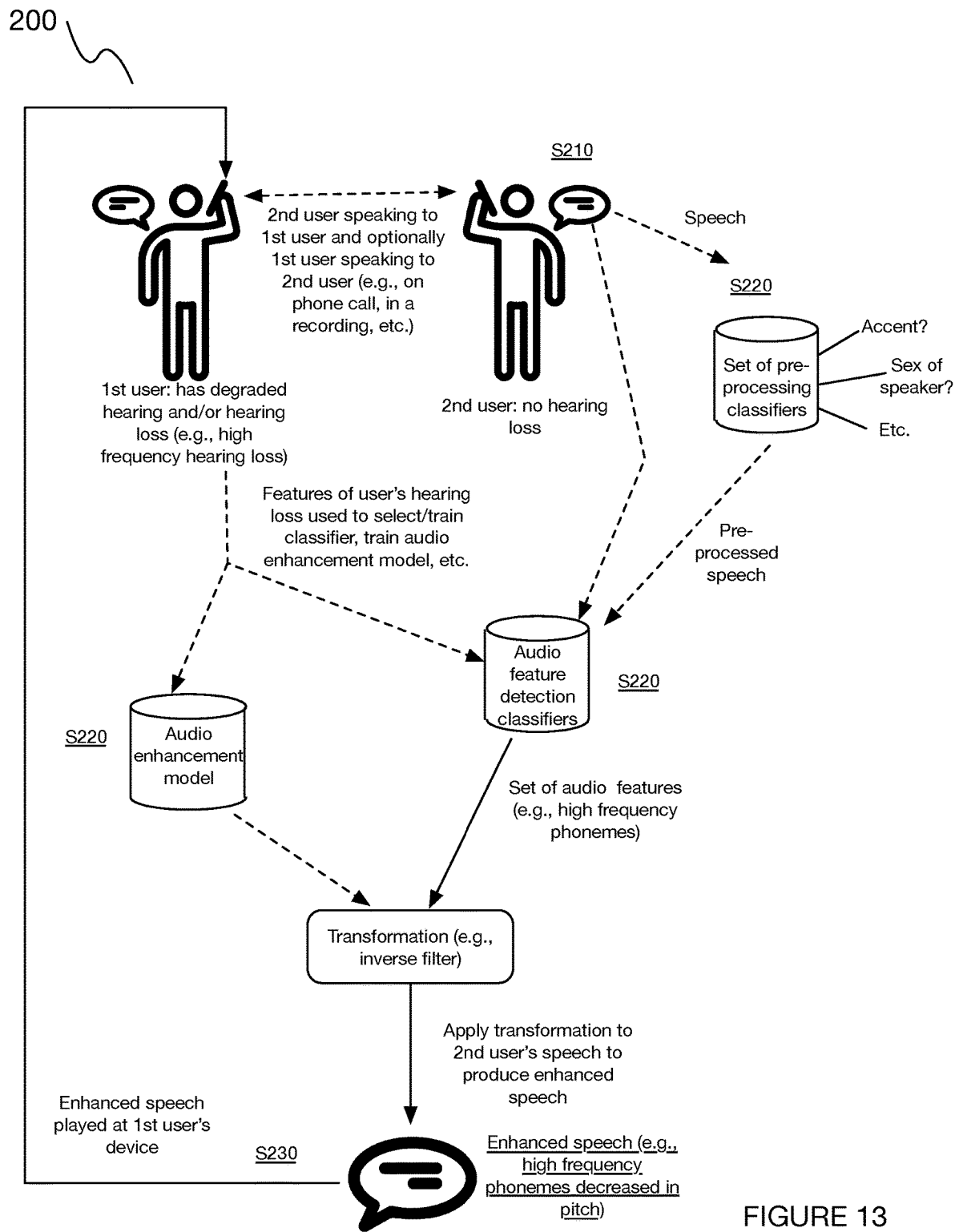
FIG. 13 is a schematic of a specific example of a method for audio enhancement.

In a preferred set of variations, for instance, the processing subsystem implements one or more classifiers (e.g., as shown in FIG. 13), which function to inform the selection of one or more models and/or algorithms described above (e.g., and used later in the method 200). The classifiers can include for instance, an accent-detection classifier, which functions to detect a particular accent associated with one or more users (e.g., user speaking to a user with a hearing impairment, user with the hearing impairment, etc.), where the particular accent can be used to: inform the selection of one or more downstream models for audio processing (e.g., models specifically trained based on that accent); determine how audio should be adjusted (and/or the associated parameters for adjusting audio) for a user (e.g., based on the particular intonations associated with that accent); and/or be otherwise used in processing and/or providing the adjusted audio to the user. The set of classifiers can additionally or alternatively be configured to determine any or all of: a sex associated with a user (e.g., such that a pitch of high frequency phonemes is adjusted more for female speakers than male speakers); a number of users participating in conversation; a topic of the conversation; a level of noise present in the environment; a distance of the speaker(s) from the user; and/or any other features of the audio.

The processing subsystem can further additionally or alternatively include and/or implement one or more models and/or algorithms configured to determine and/or produce a transformation for providing sensory outputs to the user.

In variations, for instance, in which altered audio is provided to a user, the audio is preferably altered with a transformation, which specifies the alteration of the original audio to be performed for its enhancement. The enhancement is preferably configured specifically for the user's particular hearing difficulties (e.g., high frequency hearing loss or specific to their hearing loss characteristics, possible defined by an audiogram of their hearing loss), but can additionally or alternatively be configured to optimize for any number of objectives, such as, but not limited to, any or all of: an intelligibility or other quality of the enhanced audio (e.g., according to a Perceptual Evaluation of Speech Quality [PESQ] metric, according to a short-time objective intelligibility [STOI] measure, according to a Hearing Aid Speech Perception Index [HASPI] metric, etc.), one or more phenomena associated with auditory perception (e.g., loudness recruitment effect), preferences of the user, and/or otherwise configured. The transformations can be nonlinear, linear, or any combination.

The transformation(s) used to alter the audio signal are preferably determined with a set of one or more trained models (e.g., machine learning models, deep learning models such as neural networks, trained classifiers, etc.). The one or more trained models can be trained based on data associated with the particular user (e.g., one or more audiograms of the user), trained based on data aggregated from users having a similar audio perception as the user (e.g., other users having high frequency hearing loss, where a user is assigned a model based on similarity of his or her audiogram with other users used to train the model, etc.), trained based on predicted (e.g., simulated) data (e.g., a predicted profile of a user's hearing loss based on an audiogram or other data from the user), trained based on any other data, and/or trained based on any combination of data. The trained models can optionally further be trained to penalize outcomes which would sound abnormal to the user. In some cases, for instance, in which a pitch of an audio feature is adjusted (e.g., decreased for high frequency phonemes), if the pitch is altered too much, the resulting audio can sound abnormal and/or unintelligible. To prevent this, the transformation(s) can optionally be trained or designed with any or all of a word recognizer program, a phoneme recognizer problem, a speaker identification model, or any model that minimizes distance in embeddings learned through self-supervised, semi-supervised, or fully-supervised machine learning, which penalizes particular adjustments of the audio which would or could be unintelligible to the user.

Additionally or alternatively, any or all of the transformations can be determined in absence of a learned model (e.g., through static/predetermined adjustments of parameters), with one or more rule-based tools and/or processes (e.g., rule-based decision trees, lookup tables, etc.), and/or any combination.

In a first set of variants, the transformation includes a filter (e.g., inverse filter) configured to enhance the audio in a way which effectively reverses the effects of hearing loss associated with the user, where the filter is preferably determined with a trained neural network, but can additionally or alternatively be otherwise suitably determined. In specific examples, the filter is determined in accordance with a loudness recruitment effect, but can additionally or alternatively be determined in accordance with any other auditory phenomena, and/or in absence of any of these phenomena.

In a specific example of the first set of variants, an audiogram or other hearing assessment of the user is used to simulate (e.g., with a hearing loss simulator) a hearing loss (e.g., type of hearing loss, parameters associated with user's hearing loss, severity of user's hearing loss, etc.) of the user, which is then used for any or all of: selecting a filter for the user, designing a filter for the user, training a model specific to the user which is used to produce the filter, and/or otherwise used to determine a filter for the user and/or other similar users.

In a second set of variants, additional or alternative to the first, for users experiencing high frequency hearing loss, a neural network can be trained to find the optimal (with respect to one or more underlying metrics and/or heuristic functions) frequency transposition or any other suitable frequency transformation which represents the adjustment to the detected audio features (e.g., adjustment to the energy of high frequency phonemes).

Additionally or alternatively, the processing subsystem can implement and/or interface with any other tools (e.g., models, algorithms, etc.) configured to perform any or all of the method 200, and/or any other processes.

3.4 System—Variations

In a first variation of the system 100, the system includes a tactile device including a microphone and a set of tactile actuators configured to be reversible coupled to a body region of the user, wherein the tactile device includes a processing subsystem arranged at least partially onboard the tactile device, wherein the processing subsystem processes audio information received at the microphone to determine a set of stimulation patterns to be provided through that set of tactile actuators.

In a first specific example (e.g., as shown in FIG. 5), the tactile device is configured to be worn on a wrist region of the user.

In a second specific example (e.g., as shown in FIG. 6), the tactile device is configured to be worn as a vest at the torso of the user.

Additionally or alternatively, the tactile device can be otherwise coupled to the user and/or remotely arranged from the user.

In a second variation of the system 100, the system includes a tactile device including a microphone and a set of tactile actuators configured to be reversible coupled to a body region of the user, wherein the tactile device includes a processing subsystem arranged at least partially offboard the tactile device and optionally partially onboard the tactile device, wherein the processing subsystem processes audio information received at the microphone to determine a set of stimulation patterns to be provided through that set of tactile actuators.

In a third variation of the system 100, the system includes and/or interfaces with a user device which records audio information from an environment of the user (e.g., with a set of microphones, receives audio information from another user (e.g., during a phone call), and/or retrieves audio information from an audio data source, and processes the audio with a processing subsystem (e.g., onboard the user device, remote from the user device, etc.) implementing a set of models and/or algorithms, wherein the processing subsystem processes the audio information to determine altered audio information to provide to any or all users.

Additionally or alternatively, the system 100 can include any other suitable components.

4. Method

As shown in FIG. 2, a method 200 for providing information to a user includes and/or interfaces with any or all of: receiving a set of inputs S210; processing the set of inputs to determine a set of sensory outputs S220; and providing the set of sensory outputs S230. Additionally or alternatively, the method 200 can include and/or interface with any other processes. Further additionally or alternatively, the method 200 can include and/or interface with any or all of the processes described in U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, U.S. application Ser. No. 15/959,042, filed 20 Apr. 2018, U.S. application Ser. No. 17/033,433, filed 25 Sep. 2020, and U.S. application Ser. No. 17/144,076, filed 7 Jan. 2021, each of which is incorporated in its entirety by this reference, or any other suitable processes performed in any suitable order. The method 200 can be performed with a system 100 as described above and/or any other suitable system.

4.1 Method—Receiving a Set of Inputs S210

The method 200 can optionally include receiving a set of inputs S210, which functions to receive information with which to determine any or all of: a set of tactile outputs (e.g., to be conveyed at a tactile device); an altered audio signal to be provided to a user to increase an intelligibility associated with the original audio signal; any other sensory outputs; and/or can perform any other suitable functions. Additionally or alternatively, S210 can function to receive inputs with which to determine one or more operation modes of the system, determine one or more parameters associated with the system, and/or can perform any other function(s).

S210 is preferably performed initially in the method 200, but can additionally or alternatively be performed multiple times during the method 200 (e.g., at a predetermined frequency), in response to another process of the method 200, during another process of the method 200, and/or at any other times. Alternatively, the method 200 can be performed in absence of S210.

The set of inputs are preferably received at an audio input device, such as that arranged at any or all of: a tactile device, a user device, any other supplementary device, any combination, and/or at any other devices. Additionally or alternatively, inputs can be received at any or all of: one or more sensors, a client application, one or more input components (e.g., buttons, switches, etc.) of a device, a database and/or library, and/or at any other components.

The inputs can be received at any or all of: continuously, at a predetermined frequency, at a predetermined set of intervals, at a random set of intervals, in response to a trigger, and/or at any other times. Alternatively, the method 200 can be performed in absence of receiving a set of inputs S210.

The set of inputs received in S210 preferably includes audio information from an environment of the user and/or from an audio source (e.g., another user speaking to the user locally and/or remotely, an audio file, etc.) which a user is listening to, wherein the audio inputs received (e.g., at a microphone of the tactile device, at a microphone of a user device in communication with the tactile device, etc.) are used to determine and/or trigger sensory outputs (e.g., haptic stimulation, altered audio, etc.), such as contemporaneously with (e.g., in quick succession after, overlapping with, partially overlapping with, in real time, in near real time, with negligible delay, etc.) the occurrence of the audio information.

The audio input is preferably in the form of an audio signal, further preferably an audio waveform (e.g., single-channel audio signal, dual-channel audio signals, multi-channel audio signals in the case of multiple microphones, etc.), wherein the audio waveform can be processed in accordance with any or all of the subsequent processes of the method. Additionally or alternatively, any other suitable audio input(s) can be received. The audio input is preferably received at a microphone of a sensor subsystem of the system, such as a microphone (e.g., single microphone, multiple microphones, etc.) onboard a housing of a wearable tactile device, but can additionally or alternatively be received from a microphone of a separate sensor subsystem (e.g., onboard a user device), a remote computing system, and/or any other suitable sensor or information source.

The audio signal can optionally include speech information from one or more users, such as speech occurring during a call (e.g., phone call, video call, etc.), speech naturally occurring in an environment of a user (e.g., collected at a user device of the user, collected at a hearing aid of the user, conveyed through a speaker in an environment of the user such as at an event and/or concert, etc.), speech occurring in recorded and/or pre-recorded audio (e.g., podcast, audio book, television show, etc.), and/or any other speech. The audio signal can additionally or alternatively include non-speech audio, such as, but not limited to, any or all of: music, environmental sounds (e.g., crosswalk indicators, sirens, alarms, etc.), and/or any other sounds.

The audio signal can be collected dynamically and continuously, such as while a user is participating in a call with a user, while the user is conversing with a friend, while the user is detecting speech in his or her environment, and/or during any other dynamic interactions. Additionally or alternatively, an audio signal can be received as a whole and/or at a single time prior to the user's listening, such as in an event of pre-recorded audio like an audiobook, podcast, and/or any other audio. Further additionally or alternatively, pre-recorded audio can be processed dynamically and continuously, such as during playback by the user.

The audio signal can be received from any or all of: a user device of the user (e.g., via a calling application and/or platform executing on the user device, via a 3$^{rd}$ party client application executing on the user device, etc.); a microphone (e.g., onboard a user device of the user, remote from the user device, in an environment of the user, etc.); retrieved from a database and/or server (e.g., cloud); and/or received from any other suitable sources.

In a first set of variants, an audio signal is collected from a user device (e.g., smartphone) while a user is on a phone call with a second user, wherein the speech from the second user is processed and enhanced for easier perception by the user.

In a second set of variants, recorded audio (e.g., from a podcast, audio book, movie, etc.) is processed to determine enhanced audio, which can then be played back to the user (e.g., at a later time, upon initiation by the user, etc.).

In a third set of variants, an audio signal which is dynamically received at a hearing aid of the user is processed and enhanced for easier perception by the user.

The inputs can additionally or alternatively include any or all of: user preferences and/or other user inputs (e.g., indicating a user condition, loudness preferences, tinnitus frequency associated with the user's condition, operation mode selection, etc.), and/or any other inputs.

4.2 Method—Processing the Set of Inputs to Determine a Set of Sensory Outputs S220

The method 200 can include processing the set of inputs to determine a set of sensory outputs S220, which functions to process the information received in S210 in order to determine a set of outputs (e.g., tactile outputs, enhanced and/or otherwise altered audio outputs, etc.) to be provided to the user. Additionally or alternatively, S220 can perform any other suitable functions.

S220 is preferably performed based on and in response to S210, but can alternatively be performed in absence of S210, multiple times during the method 200, in response to and/or during another process of the method 200, and/or at any other suitable times or in response to any other information and/or triggers.

S220 is preferably performed with a processing subsystem (e.g., as described above), and further preferably with a set of models and/or algorithms (e.g., as described above), but can additionally or alternatively be performed with any suitable processors, computers, and/or combination of devices. In preferred variations, S220 is at least partially performed on edge and with embedded processing, such as at a sensory output device (e.g., user device of the user, tactile device, etc.), where the audio signal for processing is received at the sensory output device (e.g., through a calling application, through a microphone of the device, etc.). This can function to promote privacy of the user and his or her information, reduce latency associated with processing and providing audio signals to the user, and/or enable energy consumption in executing the method to be minimized. Additionally or alternatively, any or all of S220 can be performed remote from the sensory output device (e.g., at a cloud computing system), at another device, at multiple devices, at a combination of locations, and/or at any other locations.

Figure 12:
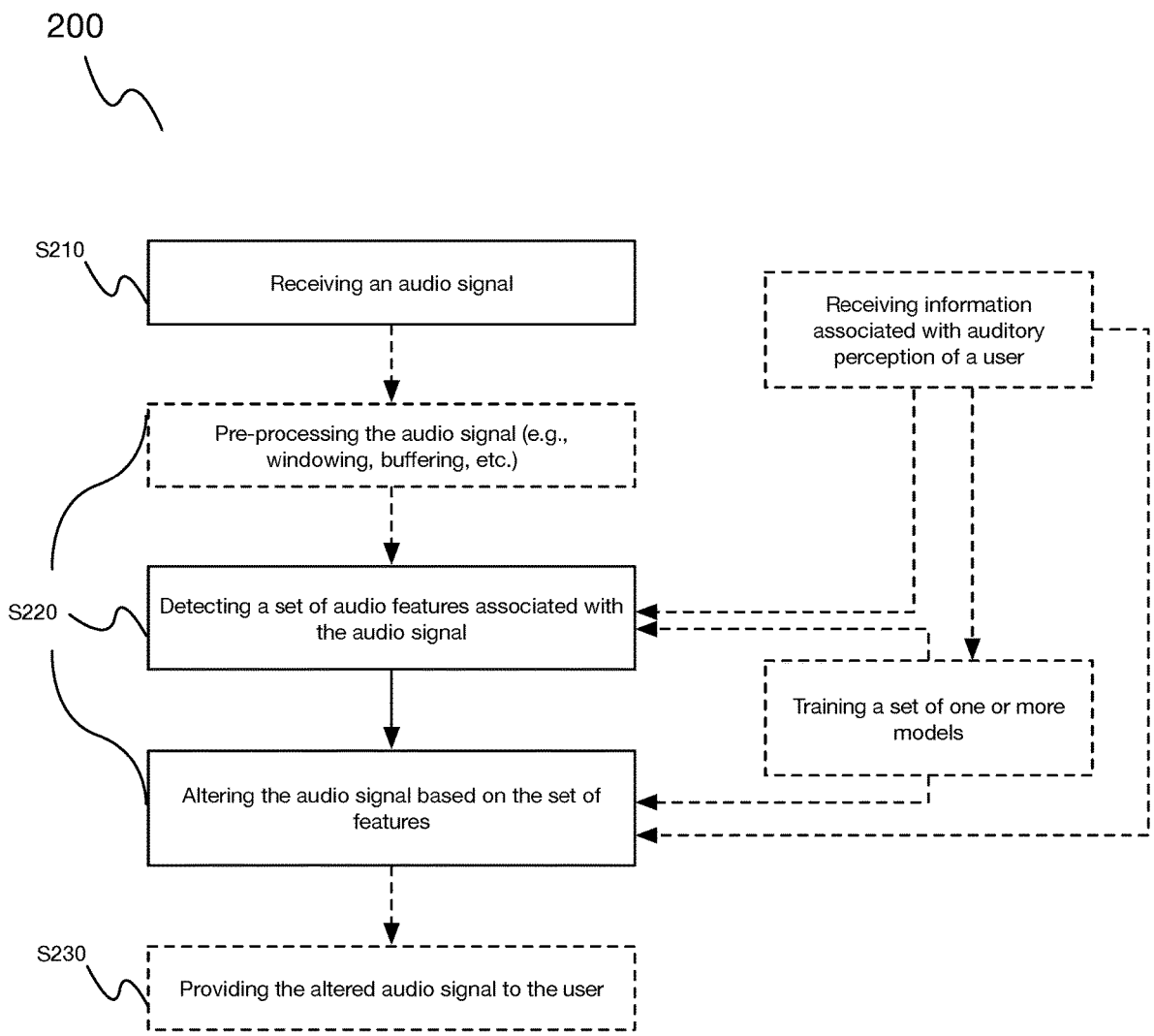
FIG. 12 is a schematic of a variation of a method for providing sensory information in the form of audio enhancement.

S220 can optionally include pre-processing the audio signal (e.g., as shown in FIG. 12), which functions to prepare the audio for further processing.

Pre-processing the audio signal can include windowing a time series audio signal into a set (e.g., series) of frames (e.g., overlapping frames, partially overlapping frames, etc.), which can be individually processed, processed in parallel, processed partially in parallel, and/or otherwise processed. Alternatively, an audio signal can be processed in absence of windowing, such as in an event where an entire audio signal has been recorded and will be played back to the user (e.g., in the form of an audio book).

Additionally or alternatively, pre-processing the audio signal can include buffering any or all of the audio signal Pre-processing the audio signal can optionally include running one or more classifiers (e.g., as shown in FIG. 13), which functions to inform the selection of one or more models and/or algorithms used later in the method 200. The classifiers can include for instance, an accent-detection classifier, which functions to detect a particular accent associated with one or more users (e.g., user speaking to a user with a hearing impairment, user with the hearing impairment, etc.), where the particular accent can be used to: inform the selection of one or more downstream models for audio processing (e.g., models specifically trained based on that accent); determine how audio should be adjusted (and/or the associated parameters for adjusting audio) for a user (e.g., based on the particular intonations associated with that accent); and/or be otherwise used in processing and/or providing the adjusted audio to the user. The set of classifiers can additionally or alternatively be configured to determine any or all of: a sex associated with a user (e.g., such that a pitch of high frequency phonemes is adjusted more for female speakers than male speakers); a number of users participating in conversation; a topic of the conversation; a level of noise present in the environment; a distance of the speaker(s) from the user; and/or any other features of the audio.

In a set of variations, for instance, S220 includes pre-processing the audio signal with a set of classifiers to select and/or otherwise inform (e.g., select weights for) the trained models and/or algorithms used to process the audio signal (e.g., to detect a set of high frequency phonemes as described below) to produce an altered audio signal, which functions to alter the audio signal for enhanced perception by the listening user.

In another set of variations, pre-processing the audio signal with a set of classifiers enables selection of a set of trained models for use in providing tactile outputs to the user.

S220 preferably includes detecting a set of audio features associated with the set of audio signals S220 (e.g., as shown in FIG. 2), which functions to determine which parts of the audio should be enhanced, provided through other sensory outputs (e.g., tactile outputs), and/or otherwise further processed. Alternatively, all of the audio signal can be further processed and/or the audio signal can be processed in absence of detecting features. In a set of preferred variations, the set of audio features includes phonemes, further preferably high frequency phonemes, but can additionally or alternatively include any or all of: particular words, particular sounds (e.g., sirens, alerts, etc.), particular phrases/expressions, speech associated with a detected context, and/or any other features. The set of audio features can further additionally or alternatively include the absence of audio, such as a detection that a portion of audio is missing (e.g., portion of user's speech was cut off, portion of user's speech was uninterpretable/unintelligible [e.g., due to the simultaneous occurrence of a loud sound in his or her environment], etc.) from the audio signal and should be replaced with intelligible audio (e.g., based on a prediction of what the speech contained and/or should have contained, based on a prediction of which phoneme was most likely to have occurred, etc.), such as replacement audio, enhanced replacement audio (e.g., if the missing audio corresponds to a high frequency phoneme), and/or any other audio. Additionally or alternatively, any other audio features can be detected.

The audio features are preferably detected with one or more trained models (e.g., as described above, a trained classifier for phoneme detection, etc.), which function to automatically detect audio features in the audio signal. Additionally or alternatively, the set of trained models can be configured for any or all of: distinguishing audio features (e.g., high frequency audio features) from noise, detecting audio features in both near and far field conditions, detecting audio features with only a single microphone, detecting audio features with multiple microphones, robustly detecting audio features with limited computing (e.g., onboard a wearable device), detecting audio features with low latency, optimizing for a tradeoff between low latency and high performance, and/or any the set of trained models can be otherwise suitably configured. Further additionally or alternatively, detecting audio features can include one or more manual processes (e.g., rule-based algorithms, rule-based decision trees, etc.), any combination of learned and manual processes, any other processes, and/or any or all of the processes described in U.S. application Ser. No. 17/144,076, filed 7 Jan. 2021, and U.S. patent application Ser. No. 15/696,997, filed 6 Sep. 2017, each of which is incorporated herein in its entirety by this reference.

In a preferred set of variations involving phoneme detection (e.g., high frequency phonemes), S220 includes implementing one or more trained models (e.g., neural networks) to process audio information and identify high frequency phonemes (e.g., /th/, /f/, /s/, /h/, /k/, /z/, /b/, /dh/, /t/, /d/, /v/, etc.) present in the audio (e.g., from a particular user, from a user speaking, etc.).

In examples of this preferred set of variations, the set of trained models includes one or more neural networks, the neural networks including a set of recurrent neural net layers which function to detect a set of high frequency phonemes (e.g., specific to the user's hearing loss, fixed for all users with high frequency hearing loss, etc.). The neural network further preferably includes one or more convolutional layers, which function to improve the detection of time and/or frequency features in the collected audio, thereby providing additional information with which the neural network can use to make decisions (e.g., deciding between two different phonemes). The convolutional layer preferably includes a lookahead mechanism to provide this benefit, but can additionally or alternatively be otherwise configured and/or designed.

Additionally or alternatively, the neural networks can be any or all of: absent of recurrent neural net layers, absent of convolutional layers, and/or can include any other architecture. Further additionally or alternatively, any other audio features can be detected in the audio signal(s) in any suitable way(s).

In a first set of variations, S220 includes determining a set of tactile outputs based on the audio information received in S210. Determining the set of tactile outputs preferably includes determining a set of stimulation patterns (e.g., as described above) based on audio information received in S210 and a set of models (e.g., set of trained models as described above). In variations including an actuation subsystem having a set of one or more tactile actuators, determining tactile outputs can include determining any or all of: which actuators to actuate, which parameters to actuate the actuators with (e.g., frequency, amplitude, temporal parameters, etc.), and/or any other information. Additionally or alternatively, the tactile outputs can include any other features and/or parameters.

Figure 9:
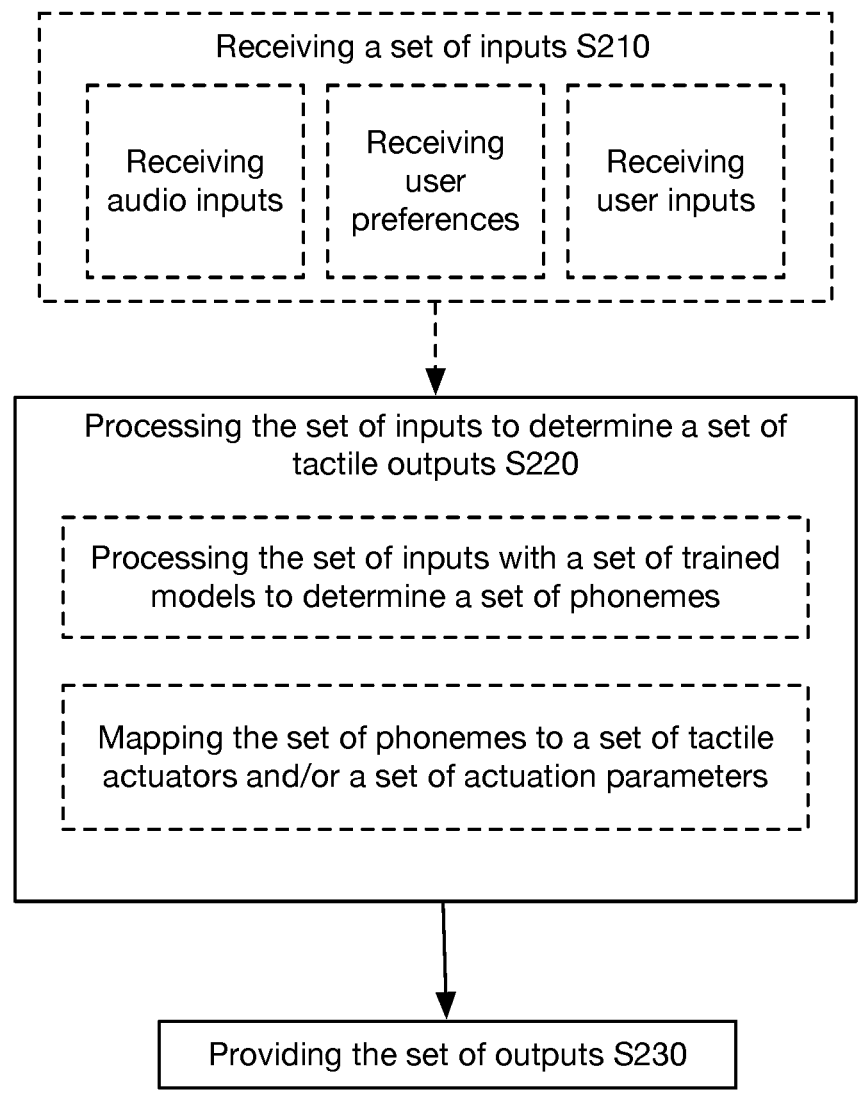
FIG. 9 depicts a schematic variation of a method for providing sensory information to a user, the sensory information including tactile information.
Figure 10:
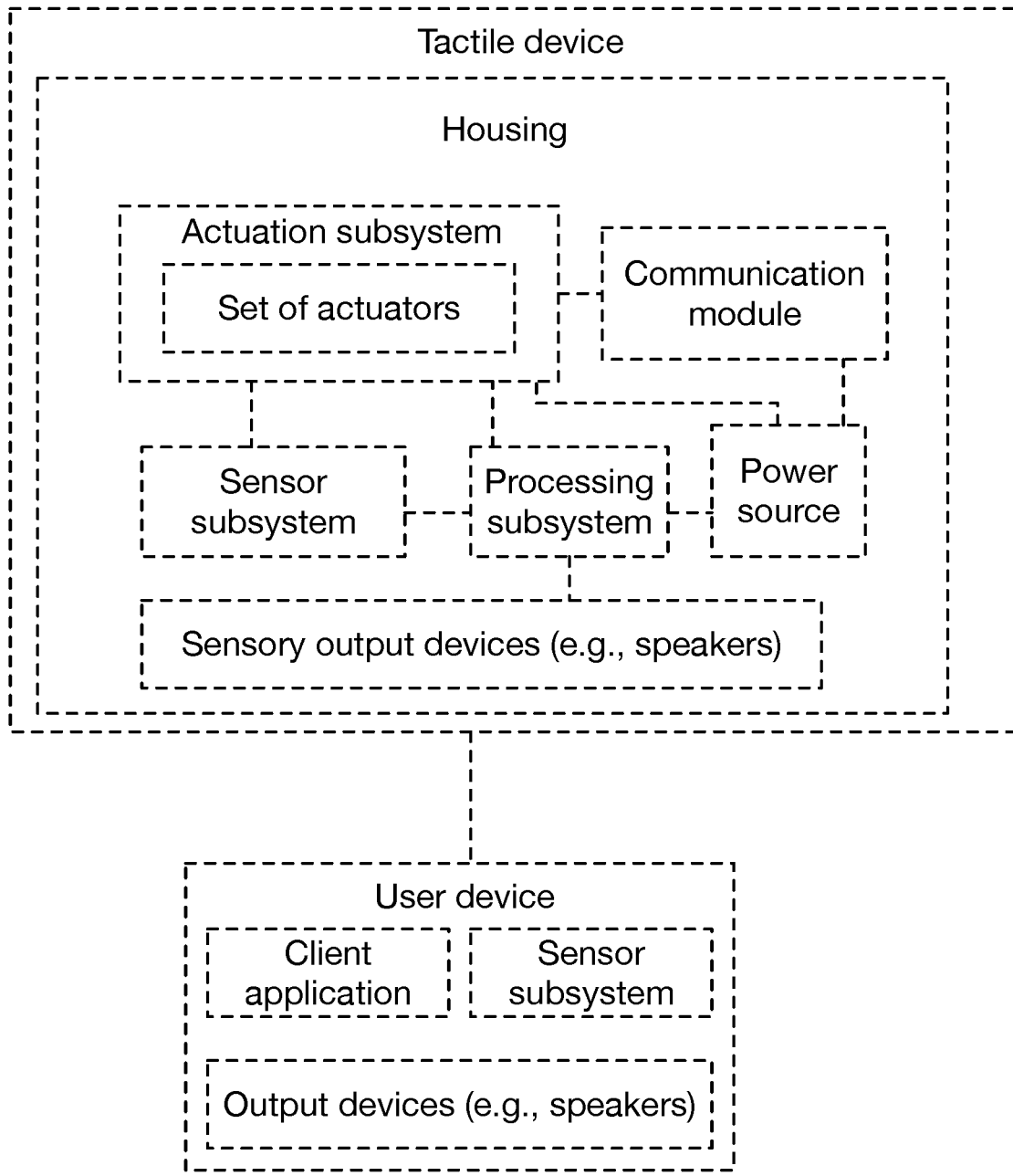
FIG. 10 depicts a variation of a system for providing sensory information to a user, the sensory information including tactile information.

In some examples, for instance, any or all of the features and/or parameters associated with the tactile output (e.g., stimulation patterns) are determined based on the audio input received at a microphone of the tactile device, such as which (if any) high frequency phonemes are present in the audio input. In preferred variations, for instance, at least a location or set of locations of tactile stimulation is determined based on the detection of a particular high frequency phonemes and optionally one or more mappings between the high frequency phonemes and the set of actuators (e.g., as shown in FIG. 9). The phonemes can be mapped to a location in a 1:1 fashion, multiple phonemes can be mapped to a single actuator (e.g., collectively forming a "super phoneme" for phonemes which sound alike such as /d/ and /t/ or others), a single phoneme can be mapped to multiple actuators, and/or any combination. Additionally or alternatively, phonemes or other features can be distinguished based on any of the other actuation parameters, such as intensity of vibration, frequency of vibration, temporal parameters of vibration (e.g., pulse duration), spatial parameters (e.g., single actuator vs. multiple actuators), other features of vibration (e.g., sweeping pulses), textural features (e.g., actuator taking on different intensity values over time), an increasing or decreasing intensity over time for an actuator, and/or any other features. In some specific examples, for instance, any or all of the actuation parameters can take into account a priority associated with a detected phoneme, such as whether or not the phone is classified as coming from speech or coming from the environment.

The mappings are preferably predetermined (e.g., such that the user can learn these mappings and thereby interpret the tactile information), but can additionally or alternatively be dynamically determined. In specific examples, the mappings include any or all of those described in U.S. patent application Ser. No. 15/696,997, filed 6 Sep. 2017, which is incorporated herein in its entirety by this reference.

The location can include any or all of: an assignment of a particular tactile actuator in a set of multiple tactile actuators, a location at or between actuators (e.g., for illusion-based tactile stimulation), any combination, and/or any other suitable locations. Additionally or alternatively, any other parameters (e.g., amplitude and/or intensity of vibration) can be determined based on the detected high frequency phoneme(s). Further additionally or alternatively, any other features of the audio input (e.g., loudness) can be used to determine the tactile outputs.

Additionally or alternatively, any or all of the features and/or parameters of the tactile output can be determined based on information from the audio input (e.g., high frequency phonemes, loudness, distance of sound source to device, etc.), predetermined (e.g., based on a product specification of the tactile actuator, based on a fixed frequency of an LRA, based on a user preference, etc.), determined based on other information, and/or otherwise determined.

Additionally or alternatively, any or all of the tactile output features and/or parameters can be determined with one or more algorithms, such as any or all of the algorithms described in U.S. application Ser. No. 17/144,076, filed 7 Jan. 2021, which is incorporated herein in its entirety by this reference.

In a second set of variations, S220 includes altering the audio signal based on the set of audio features to produce an altered audio signal S230 (e.g., as shown in FIG. 12). Additionally or alternatively, the audio signal can be altered based on any other information (e.g., user input, specifics of user's hearing loss, etc.), in absence of a set of detected features, and/or otherwise suitably processed. Further additionally or alternatively, a new audio signal can be produced, and/or any other audio signal can be determined.

The audio features can be altered (equivalently referred to herein as conditioned) through the adjustment of one or more audio parameters, such as, but not limited to, any or all of: frequency and/or pitch (e.g., decreasing the pitch of a high frequency phoneme, increasing the pitch of a low frequency phoneme, compressing a frequency range such as through dynamic range compression, etc.), volume/energy (e.g., increasing the volume of a high frequency phoneme, increasing the volume of any audio feature which the user has difficulty perceiving, decreasing the volume of noise present in the signal, etc.), duration (e.g., increasing duration of high frequency phonemes or other auditory features which the user has difficulty perceiving), and/or any other adjustments.

Additionally or alternatively, parts of the audio signal other than those associated with audio features to be enhanced can be altered. In some variations, for instance, in an event that a certain audio feature will be lengthened in duration, a less crucial or more easily interpretable part of the audio signal (e.g., gap, low frequency phoneme, etc.) can be correspondingly shortened such that the total length of the audio signal remains the same and/or close to its original duration. This can be critical in audio signals received from dynamic conversations, where a repeated increase in duration of a particular user's audio could cause compounded delays as the users try to converse.

The audio is preferably altered with a transformation, which specifies the alteration of the original audio to be performed for its enhancement. The enhancement is preferably configured specifically for the user's particular hearing difficulties (e.g., high frequency hearing loss or specific to their hearing loss characteristics, possible defined by an audiogram of their hearing loss), but can additionally or alternatively be configured to optimize for any number of objectives, such as, but not limited to, any or all of: an intelligibility or other quality of the enhanced audio (e.g., according to a Perceptual Evaluation of Speech Quality [PESQ] metric, according to a short-time objective intelligibility [STOI] measure, according to a Hearing Aid Speech Perception Index [HASPI] metric, etc.), one or more phenomena associated with auditory perception (e.g., loudness recruitment effect), and/or otherwise configured. The transformations can be nonlinear, linear, or any combination.

The transformation(s) used to alter the audio signal are preferably determined with a set of one or more trained models (e.g., machine learning models, deep learning models such as neural networks, trained classifiers, etc.). The one or more trained models can be trained based on data associated with the particular user (e.g., one or more audiograms of the user), trained based on data aggregated from users having a similar audio perception as the user (e.g., other users having high frequency hearing loss, where a user is assigned a model based on similarity of his or her audiogram with other users used to train the model, etc.), trained based on predicted (e.g., simulated) data (e.g., a predicted profile of a user's hearing loss based on an audiogram or other data from the user), trained based on any other data, and/or trained based on any combination of data. The trained models can optionally further be trained to penalize outcomes which would sound abnormal to the user. In some cases, for instance, in which a pitch of an audio feature is adjusted (e.g., decreased for high frequency phonemes), if the pitch is altered too much, the resulting audio can sound abnormal and/or unintelligible. To prevent this, the transformation(s) can optionally be trained or designed with any or all of a word recognizer program, a phoneme recognizer problem, a speaker identification model, or any model that minimizes distance in embeddings learned through self-supervised, semi-supervised, or fully-supervised machine learning, which penalizes particular adjustments of the audio which would or could be unintelligible to the user.

Additionally or alternatively, any or all of the transformations can be determined in absence of a learned model (e.g., through static/predetermined adjustments of parameters), with one or more rule-based tools and/or processes (e.g., rule-based decision trees, lookup tables, etc.), and/or any combination.

In some examples, the transformation includes an inverse filter configured to enhance the audio in a way which effectively counteracts the effects of hearing loss associated with the user, where the inverse filter is preferably determined with a trained neural network, but can additionally or alternatively be otherwise suitably determined. In specific examples, the inverse filter is determined in accordance with a loudness recruitment effect, but can additionally or alternatively be determined in accordance with any other auditory phenomena, and/or in absence of any of these phenomena.

In a specific example, an audiogram or other hearing assessment of the user is used to simulate (e.g., with a hearing loss simulator) a hearing loss (e.g., type of hearing loss, parameters associated with user's hearing loss, severity of user's hearing loss, etc.) of the user, which is then used for any or all of: selecting an inverse filter for the user, designing an inverse filter for the user, training a model specific to the user which is used to produce the inverse filter (e.g., for audio enhancement methods), and/or otherwise used to determine an inverse filter for the user and/or other similar users.

In another specific example, additional or alternative to the first, for users experiencing high frequency hearing loss, a neural network can be trained to find the optimal (with respect to one or more underlying metrics and/or heuristic functions) frequency transposition or any other suitable frequency transformation which represents the adjustment to the detected audio features (e.g., adjustment to the energy of high frequency phonemes).

S220 can additionally or alternatively include determining any other outputs (e.g., visual), and/or any other processes.

In a first variation, S220 includes processing audio received at a set of one or more microphones with a set of trained models (e.g., as described above) to detect if a high frequency phoneme is present in the audio (e.g., in a most recent frame of audio), wherein in an event that a high frequency phoneme is present, the phoneme is mapped to a particular location and/or set of actuation parameters to be provided at the tactile device.

In a second set of variations, S220 includes optionally pre-processing the audio signal received in S210; detecting a set of features present in the audio with a trained classifier or classifiers; processing the set of features with a learned inverse filter to determine a set of adjustments to be made to the detected features to enhance the audio for the user; and optionally altering other portions of the audio signal (e.g., shortening less important portions of the audio signal to maintain a constant length of the audio signal in an event that some of the detected audio features will be lengthened) in response to determining the set of adjustments.

In a specific example of the second set of variations, the inverse filter is selected or built for the user based on information associated with the user's hearing (e.g., an audiogram) and optionally one or more simulations of the user's hearing loss based on the information. Additionally or alternatively, an inverse filter can be determined (e.g., selected, tuned, etc.) for a user according to a user's assignment to a particular subgroup of users based on similarities between the user's hearing loss and the hearing loss of users in that subgroup (e.g., subgroup of users having a similar high frequency hearing loss as determined based on the user's audiogram and/or simulated hearing loss).

In a second specific example, additional or alternative to the first, the inverse filter is determined with a model specifically trained for the particular user.

In a third set of variations, additional or alternative to those described above, S220 includes optionally pre-processing the audio signal received in S210; detecting a set of features present in the audio with a trained classifier or classifiers; processing the set of features with a trained neural network to determine an optimal set of adjustments (e.g., frequency transposition and/or any other suitable frequency transformation) to be made to the detected features to enhance the audio for the user; and optionally altering other portions of the audio signal (e.g., shortening less important portions of the audio signal to maintain a constant length of the audio signal in an event that some of the detected audio features will be lengthened) in response to determining the set of adjustments.

In a fourth set of variations, additional or alternative to those above, S220 includes optionally pre-processing the audio signal received in S210; detecting a set of features present in the audio with a trained classifier or classifiers; applying a set of predetermined adjustments (e.g., predetermined pitch adjustment for each high frequency phoneme) to the detected audio features to enhance the audio for the user; and optionally altering other portions of the audio signal (e.g., shortening less important portions of the audio signal to maintain a constant length of the audio signal in an event that some of the detected audio features will be lengthened) in response to the set of adjustments.

In a fifth set of variations, additional or alternative to those above, S220 includes optionally pre-processing the audio signal received in S210; detecting a set of features present in the audio with a trained classifier or classifiers; replacing the detected features with predetermined audio; and optionally altering other portions of the audio signal (e.g., shortening less important portions of the audio signal to maintain a constant length of the audio signal in an event that some of the detected audio features will be lengthened) in response to the replaced audio.

4.3 Method—Providing the Set of Sensory Outputs S230

The method 200 can include providing the set of sensory outputs S230, which functions to provide information to the user which enhances the interpretability and/or intelligibility associated with the audio information. Additionally or alternatively, S230 can perform any other functions.

The sensory outputs can optionally include tactile outputs, which are preferably provided at an actuation subsystem of a tactile stimulation device, but can additionally or alternatively be elsewhere and/or otherwise provided. The tactile outputs are further preferably provided with a haptic driver (e.g., as described above), but can additionally or alternatively be provided with any other components. In preferred variations, for instance, S230 includes, at the distribution of haptic actuators, cooperatively producing a haptic output representative of at least a portion of the input signal through executing control signals at the haptic driver, thereby providing information to the user.

In the variations and examples described above, phoneme outputs generated in S220 can be encoded, mapped, and delivered through the array of tactile interface devices in a manner similar to the natural timing of speech. In more detail, stimulus provision preferably occurs in real-time or near real-time (e.g., within a time threshold, such as 100 ms, 90 ms, 75 ms, 50 ms, 110 ms, 125 ms, 150 ms, 200 ms, 300 ms, any range between these values, etc.), such that the user perceives tactile feedback substantially simultaneously with reception of input signals in S210 (e.g., is unable to discern a delay between the input signal and tactile feedback), with minimal delay. However, delivery of haptic stimuli can alternatively be implemented in a manner that does not mimic natural speech timing. As such, delivery of haptic stimuli can be implemented with any suitable speed, frequency, cadence, pauses (e.g., associated with grammatical components of language), gain (e.g., amplitude of stimulation corresponding to "loudness" or punctuation), pattern (e.g., spatiotemporal pattern played using subarrays of the array of tactile interface devices, etc.), and any other suitable output component.

The sensory outputs can additionally or alternatively include audio outputs, such as an altered audio signal provided to the user at a set of audio output devices, which functions to enhance the user's listening experience and interpretation of the audio.

The altered audio signal is preferably played back with minimal delay relative to when the audio was recorded, which can function, for instance, to enable natural conversation to occur between users despite implementation of the method 100. The delay can optionally be configured to be less than, equal to, or not significantly more than (e.g., less than 2×, within an order of magnitude larger, etc.) the lag typically experienced in phone calls. Additionally or alternatively, the delay can be otherwise configured.

This minimal delay is preferably less than 100 milliseconds (ms) (e.g., 100 ms or less, 90 ms or less, 80 ms or less, 75 ms or less, 70 ms or less, 60 ms or less, 50 ms or less, 40 ms or less, 30 ms or less, 20 ms or less, 10 ms or less, between 50-100 ms, less than 50 ms), but can alternatively be greater than 100 ms (e.g., 150 ms, between 100 and 150 ms, 200 ms, between 150 and 200 ms, greater than 200 ms, etc.).

The altered audio signal can optionally be provided at/through any or all of: a physical speaker (e.g., of a user device), a virtual speaker (e.g., of a user device), a $3^{rd}$ party platform (e.g., a teleconferencing platform and/or client application), and/or the altered audio signal can be otherwise suitably provided.

Sensory output provision in S230 can, however, include any other processes and/or be implemented in any other suitable manner.

Figure 4:
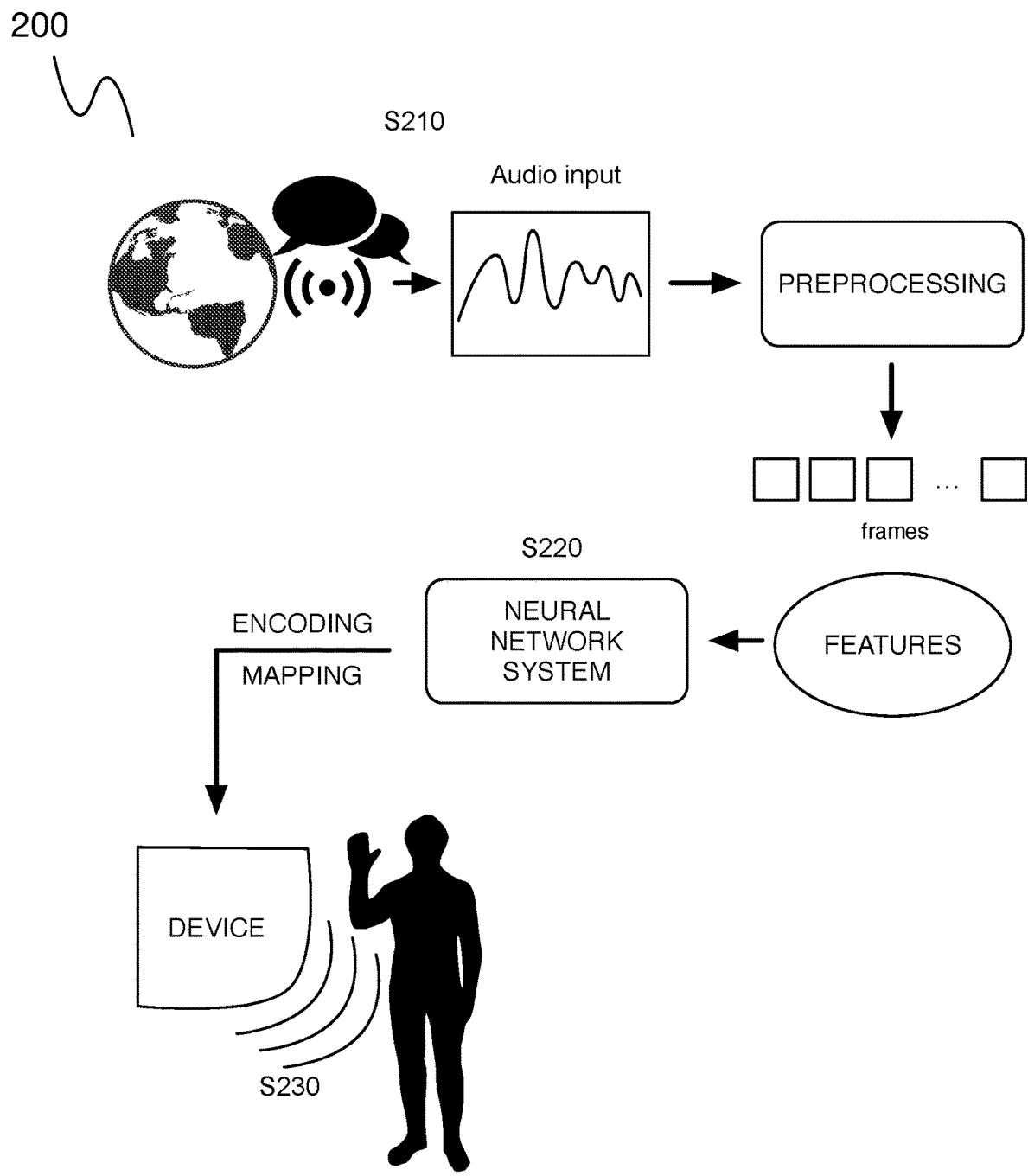
FIG. 4 depicts a schematic variation of the method for providing information to a user.

The method 200 can additionally or alternatively include any other processes, such as, but not limited to, any or all of: training any or all of the set of models (e.g., as described above) (e.g., as shown in FIG. 12), retraining any or all of the set of models (e.g., in response to collecting data from users), preprocessing the set of inputs (e.g., to determine a set of frames as shown in FIG. 4), and/or any other processes.

4.4 Method: Variations

Figure 7:
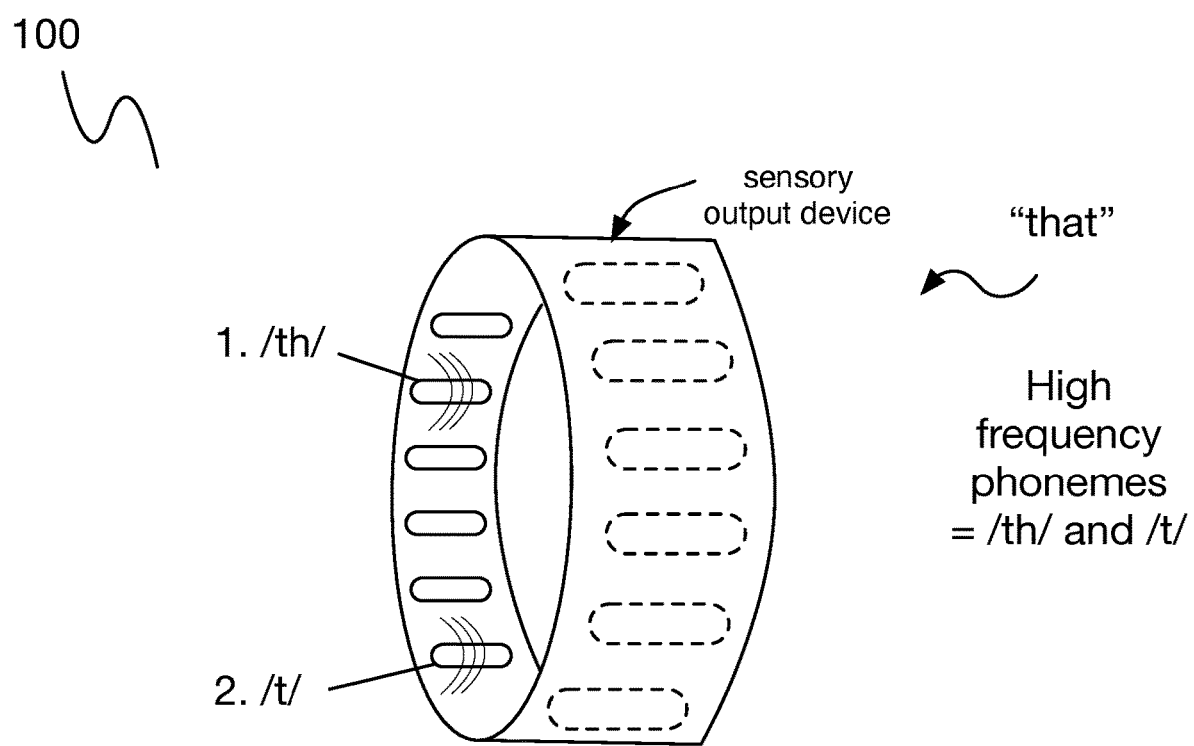
FIG. 7 depicts a variation of providing tactile stimulation corresponding to high frequency phonemes at a sensory output device (e.g., wrist-borne tactile device, limb-borne tactile device, etc.).

In a first variation of the method 200 (e.g., as shown in FIG. 7), the method is configured to allow users with high-frequency hearing loss receive tactile information corresponding to high frequency phonemes (e.g., /th/, /f/, /s/, /h/, /k/, /z/, /b/, /dh/, /t/, /d/, /v/, etc.), wherein the method includes: receiving audio information at a set of one or more microphones, processing the audio information with a set of trained models to detect a set of high frequency phonemes, mapping the set of high frequency phonemes to a set of tactile actuators of a tactile device and/or a set of actuation parameters, and actuating the tactile actuators based on the mapping. Additionally or alternatively, the method 200 can include any other processes.

In a specific example, the audio information is received at a single microphone onboard a wearable device configured to be coupled (e.g., reversibly coupled) to the user, such as to a wrist region of the user.

Figure 11:
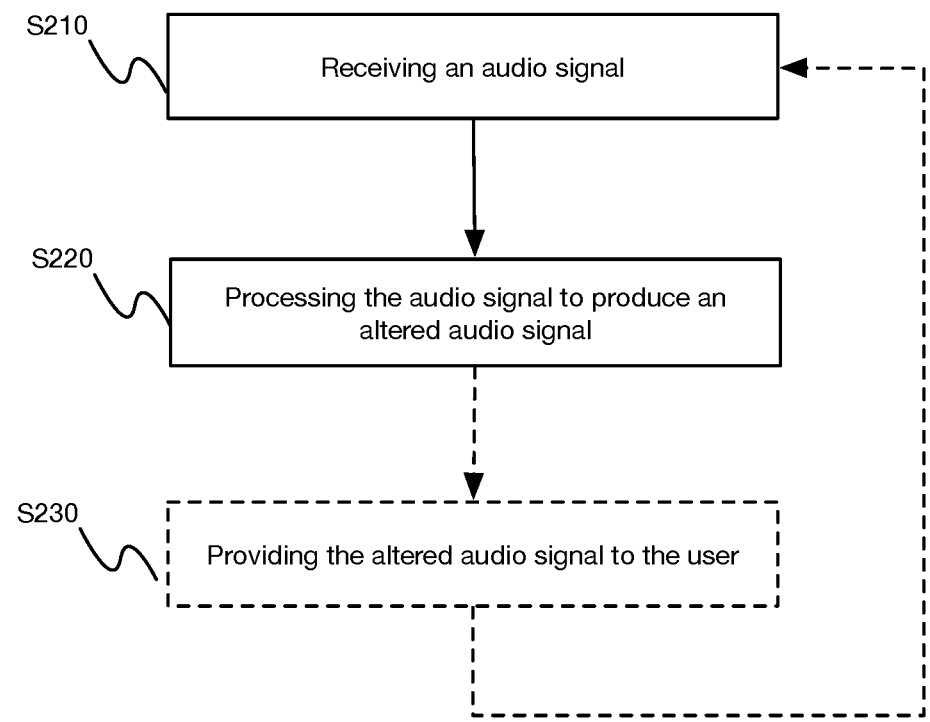
FIG. 11 is a schematic of a method for providing sensory information to a user, the information including audio information.

In a second variation of the method 200 (e.g., as shown in FIG. 11, as shown in FIG. 13, etc.), the method includes receiving audio information from a speaking user; optionally transmitting the audio information (e.g., to a device of a listening user); optionally pre-processing the audio signal to select a set of trained models and/or algorithms; detecting a set of features present in the audio with the selected models and/or algorithms; processing the set of features with a transformation (e.g., learned inverse filter) to determine a set of adjustments to be made to the detected features to enhance the audio for the listening user; and optionally altering other portions of the audio signal (e.g., shortening less important portions of the audio signal to maintain a constant length of the audio signal in an event that some of the detected audio features will be lengthened) in response to determining the set of adjustments; and providing the altered audio signal to the user.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for enhancing an intelligibility of audio information for a user, the method comprising:
   training a set of trained models using simulated audio data collected at a first location in a virtual room based on a virtual sound source at a second location in the virtual room, wherein the first location comprises a first randomized location, wherein the second location comprises a second randomized location, and wherein the virtual room has a randomized shape;
   collecting the audio information;
   processing the audio information to determine a set of features of the audio information with the set of trained models, the set of features comprising a set of high frequency phonemes and the set of trained models comprising a set of neural networks;
   calculating a set of parameters associated with the set of features;
   determining a set of adjustments for the set of parameters, wherein determining the set of adjustments comprises using a trained machine learning model to determine an inverse filter based on the set of features, wherein the set of adjustments comprises the inverse filter, wherein the machine learning model is trained based on auditory perception data associated with hearing loss of the user;
   adjusting the set of parameters based on the set of adjustments, wherein adjusting the set of parameters is operating to enhance the intelligibility of the set of features;
   determining an altered audio stream comprising the adjusted set of parameters in temporal relation with occurrence of the set of features; and
   providing the altered audio stream to the user.

2. The method of claim 1, wherein the altered audio stream comprises at least a portion of unaltered audio from the audio information.

3. The method of claim 2, further comprising pre-processing the audio information prior to processing the audio information, wherein pre-processing the audio information comprises:
   classifying the audio information with a set of classifiers, the set of classifiers comprising at least one of:
      an accent classifier configured to classify an accent of a second user, the second user speaking the audio information; and
      a sex classifier configured to classify a sex of the second user.

4. The method of claim 3, wherein a particular trained model from the set of trained models is selected and used to process the audio information based on a set of outputs produced with the set of classifiers.

5. The method of claim 3, wherein a set of adjustment values defining the set of adjustments is determined at least in part based on a set of outputs produced with the set of classifiers.

6. The method of claim 1, wherein the set of trained models is trained to implement a latency-constrained loss function, the latency-constrained loss function operable to produce an output when processing the audio information with the set of trained models within a predetermined time threshold, thereby increasing the intelligibility of a conversation between the user and a second user, the conversation comprising the audio information.

7. The method of claim 6, wherein the latency-constrained loss function enables the altered audio stream to be provided to the user with a delay of less than 100 milliseconds relative to a time at which the audio information was collected.

8. The method of claim 1, wherein the set of parameters comprises at least one of a volume and a pitch.

9. The method of claim 8, wherein the set of parameters is adjusted at least in part based on a severity parameter defining a hearing loss condition of the user.

10. The method of claim 1, wherein the audio information is collected at a mobile user device during a phone call between the user and a second user.

11. The method of claim 1, wherein the set of trained models are trained using a curriculum learning process.

12. The method of claim 1, wherein training the machine learning model comprises penalizing adjustments that could be unintelligible to the user.

13. The method of claim 1, wherein the inverse filter is determined in accordance with a loudness recruitment effect.

* * * * *